(12) United States Patent
Lesi et al.

(10) Patent No.: US 12,289,161 B2
(45) Date of Patent: Apr. 29, 2025

(54) CLOCK MANAGER MONITORING FOR TIME SYNCHRONIZED NETWORKS

(71) Applicant: INTEL CORPORATION, Santa Clara, CA (US)

(72) Inventors: Vuk Lesi, Cornelius, OR (US); Christopher Gutierrez, Hillsboro, IN (US); Manoj Sastry, Portland, OR (US); Marcio Juliato, Portland, OR (US); Shabbir Ahmed, Beaverton, OR (US); Qian Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 17/829,042

(22) Filed: May 31, 2022

(65) Prior Publication Data

US 2022/0303034 A1    Sep. 22, 2022

(51) Int. Cl.
*H04J 3/06*    (2006.01)
(52) U.S. Cl.
CPC ............ *H04J 3/0667* (2013.01); *H04J 3/067* (2013.01)
(58) Field of Classification Search
CPC ........ H04J 3/0635; H04J 3/0667; H04J 3/067; H04J 3/0685
See application file for complete search history.

(56) References Cited

U.S. PATENT DOCUMENTS

| | | | | |
|---|---|---|---|---|
| 8,873,589 B2* | 10/2014 | Aweya | ................ | H04J 3/0667 370/503 |
| 9,973,601 B2* | 5/2018 | Spada | ................ | H04J 3/0641 |
| 10,511,403 B2* | 12/2019 | Bush | ................ | H04L 63/061 |
| 10,979,208 B1* | 4/2021 | Bogdan | ................ | H04J 3/0685 |
| 2020/0252424 A1* | 8/2020 | Regev | ................ | H04J 3/0667 |
| 2020/0267672 A1* | 8/2020 | Chien | ................ | H04W 56/0055 |
| 2020/0280383 A1* | 9/2020 | Herber | ................ | H04J 3/0638 |
| 2021/0111862 A1* | 4/2021 | Dadwal | ................ | H04Q 11/04 |
| 2021/0329584 A1* | 10/2021 | Prakash | ............ | H04W 72/1268 |
| 2021/0367694 A1* | 11/2021 | Bogdan | ................ | G04F 10/005 |
| 2021/0367695 A1* | 11/2021 | Moon | ................ | H04J 3/12 |

(Continued)

OTHER PUBLICATIONS

Wikipedia—Time Appliances Project—URL: https://www.opencompute.org/wiki/Time_Appliances_Project—retrieved Nov. 19, 2021.

*Primary Examiner* — Alpus Hsu
(74) *Attorney, Agent, or Firm* — KDW Firm PLLC

(57) ABSTRACT

Techniques for clock manager monitoring for time sensitive networks are described. An apparatus, comprises a clock circuitry to manage a clock for a device, a processing circuitry coupled to the clock circuitry, the processing circuitry to execute instructions to perform operations for a clock manager, the clock manager to receive messages with time information for a network and generate clock manager control information to adjust the clock to a network time for the network, and a detector coupled to the processing circuitry and the clock circuitry, the detector to receive the clock manager control information, generate model control information based on a clock model, compare the clock manager control information with the model control information to generate difference information, and determine whether to generate an alert based on the difference information. Other embodiments are described and claimed.

25 Claims, 26 Drawing Sheets

(56) References Cited

U.S. PATENT DOCUMENTS

2022/0123849 A1* 4/2022 McCall ................ H04J 3/0658
2022/0224501 A1* 7/2022 Lesi ...................... H04J 3/0673
2022/0224701 A1* 7/2022 Gutierrez ............ H04L 63/1475

* cited by examiner

US 12,289,161 B2

CLOCK MANAGER MONITORING FOR TIME SYNCHRONIZED NETWORKS

BACKGROUND

Many computing systems require real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-sensitive networking (TSN).

In general, TSN defines a set of standards (and amendments) with the aim to enable time synchronization and deterministic data delivery in converged networks where time-critical (TC) traffic coexists with other types of traffic. Thus, there is a need to provide security for TSN devices to mitigate the risks associated with disruption in TSN operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A illustrates an aspect of a TSN 200a.
FIG. 3A illustrates an aspect of a TSN 300a.
FIG. 5A illustrates an aspect of an apparatus 500a.

FIG. 20A illustrates an aspect of a clock leader (CL) 2000a.

DETAILED DESCRIPTION

Figure 1A:
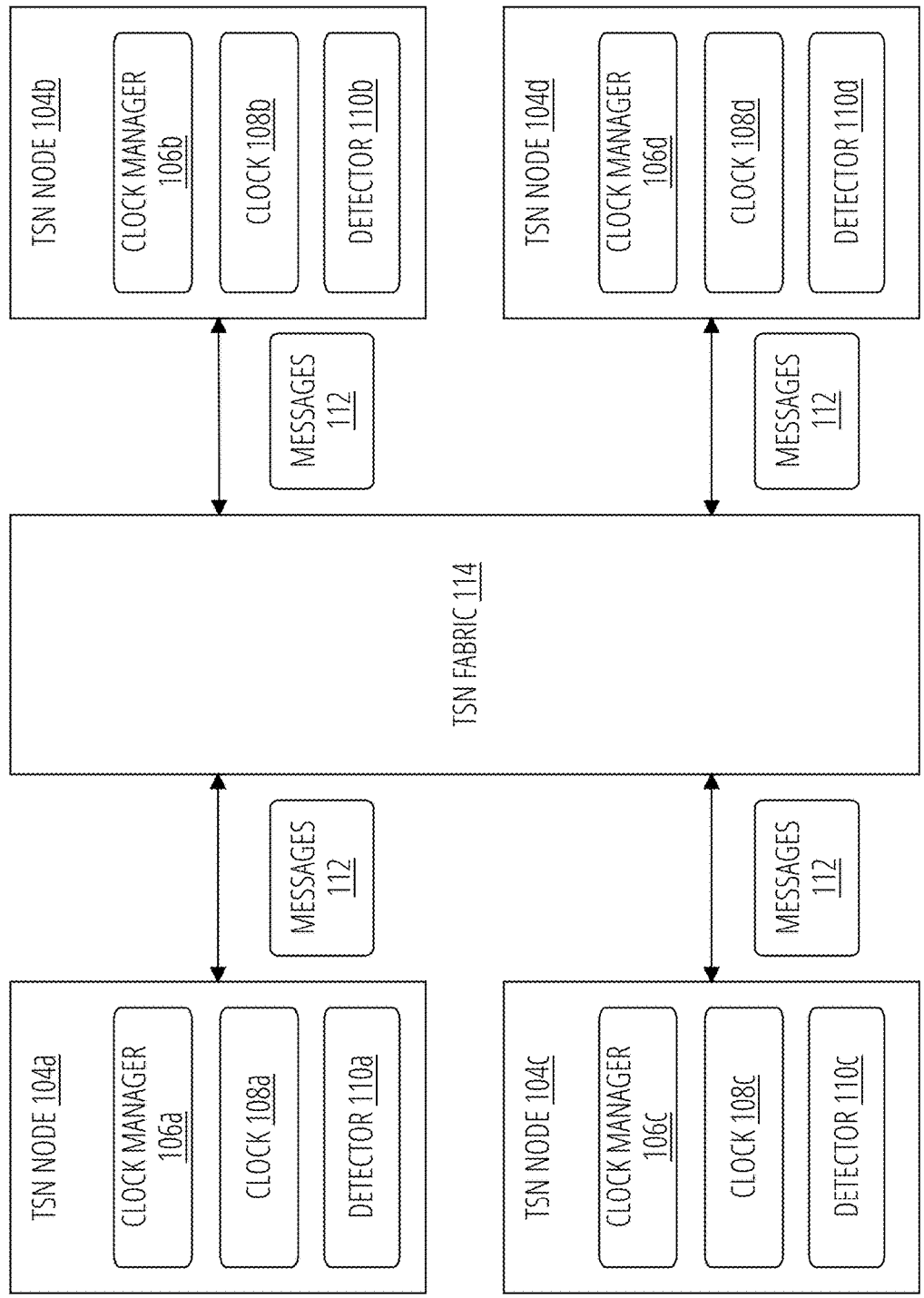
FIG. 1A illustrates an aspect of a time sensitive network (TSN) 102.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

The present disclosure is generally directed to time management and recovery techniques for systems operating on strict time requirements, such as systems based on time sensitive networks (TSNs). As noted, TSN defines a set of standards (and amendments) with the aim to enable time synchronization and deterministic data delivery in converged networks where time sensitive traffic coexists with other types of traffic. Various standards have been developed to address time-sensitive communications. Three of the more prominent standards for enabling time-sensitive communications are promulgated by the Institute of Electrical and Electronics Engineers (IEEE). For example, IEEE 1588, IEEE 802.1AS and IEEE 802.1Qbv provide systems and methods for synchronizing device clocks. In particular, IEEE 1588 provides a protocol for time synchronization across a network; IEEE 802.1AS provides a protocol for time synchronization across a TSN, where time sensitive devices (e.g., clock followers) synchronize to a leader clock (e.g., clock leader); and IEEE 802.1Qbv provides for prioritizing time sensitive traffic in the network switches using gate-controlled lists (GCLs).

Time synchronization in a TSN requires tight software-hardware interplay. A device (or node) in a TSN may implement a clock manager as a software component and a hardware clock as a hardware component. The clock manager adjusts timing for the hardware clock to ensure synchronization with a common network time for the TSN. In one embodiment, for example, a precision time protocol (PTP) hardware clock (PHC) is periodically adjusted by a PTP for Linux (PTP4L) software module to account for time offset between a clock leader and a clock follower in PTP-synchronized nodes. A corrupted software component can misconfigure or mis-control hardware, however, leading to incorrect timekeeping. Attackers located within a TSN-capable platform can tamper with the operation of the clock manager software, such as by tampering with offset sensing, clock adjustment computation, or frequency adjustment actuation. Consequently, system and applications depending on TSN capabilities will consume incorrect time. The incorrect timekeeping may further influence any applications using the time synchronization resource. Accordingly, early detection of a corrupted software component, such as a clock manager for a TSN node, is critical in a TSN.

To solve these and other problems, embodiments implement various clock manager monitoring techniques to assess whether clock hardware (e.g., a PHC) is correctly controlled by clock manager software (e.g., a PTP4L clock manager) in order to promptly flag anomalies. The clock manager monitoring techniques are based on a heterogenous and redundant analytical physics-aware model of the clock manager. These techniques are physics-aware since a standard Linux implementation of a PTP4L clock manager is based on a proportional-integral (PI) controller. These techniques are analytical (i.e., equation based) in order to cover advancements in clock manager technology, such as the design and implementation of advanced PTP servos by the Time Appliances Project. The clock manager monitoring techniques result in execution of a lightweight, verifiable model at runtime to detect deviations. This consumes less compute cycles and memory resources, while enabling earlier detection of compromised clock platforms in a TSN node.

In general, embodiments implement a detector to monitor a clock manager to identify any abnormal behavior. The detector monitors time information received by the clock manager as input, and monitors control information sent from the clock manager as output to a hardware clock. The detector compares the clock manager control information to model control information derived from a clock model to find difference information (e.g., a residual). The detector compares the difference information to a defined threshold and generates an alert or takes a security action based on results of the comparison.

A clock model and/or model control information can be predicted, derived or estimated utilizing a number of different techniques. In general, a clock model attempts to accurately model, synthesize, quantify or otherwise baseline normal behavior for a clock manager when adjusting timing for a hardware clock. The baseline normal behavior can then be used as a basis for detecting abnormal behavior of a clock manager, thereby providing indications of an attack or compromised clock manager. For instance, statistical techniques may be used to simulate operations for a clock manager. Statistical techniques, however, may not have sufficient accuracy for some security applications. Since TSN is often used to control physical systems, such as autonomous systems to control a vehicle or industrial systems to control robotic arms, physics-based techniques can be used to model physics-based controllers. Consequently, a clock model implemented for a detector can change based on a given type of TSN network and/or security application. For instance, to have a time synchronization protocol-aware relay to form a network compliant with IEEE 802.1Qbv, relay nodes should perform packet-switching on a microsecond-level. Accordingly, embodiments attempt to customize a detector and clock model for a given type of TSN network and/or security application to provide optimal results.

In some embodiments, a clock model for a detector is based on an analytical (equation-based) model of a clock manager implemented in software. This can be obtained by analyzing a clock manager implementation (e.g, code) and/ or by performing system identification based on input-output data. The detector clock model is securely executed alongside the monitored clock manager and provides predictions or estimates of the clock adjustments that should be made to the hardware clock. These predictions are compared with the actual output of the clock manager, enabling runtime assessment of whether the clock manager software is controlling the hardware clock as expected. When the detector suspects the clock manager software is corrupted, it generates an alarm signal that can be sent to an intrusion detection system (IDS) for a TSN node, a cluster of TSN nodes or a TSN.

In one embodiment, for example, an apparatus to detect abnormal behavior can be part of a device in a network that includes a clock circuitry to implement a hardware clock for the device. The device may comprise, for example, a TSN node in a TSN, such as a clock leader, a clock follower, a relay node, a switch node, and so forth. The clock circuitry may be implemented, for example, as a TSN-enabled hardware clock such as a PHC. The apparatus may comprise a processing circuitry coupled to the clock circuitry, the processing circuitry to execute instructions to perform operations for a clock manager. The clock manager may manage timing operations for the clock circuitry. The clock manager may be implemented, for example, as a physics-based clock manager, such as a PTP4L clock manager. The clock manager may receive messages with time information for a network and generate clock manager control information to adjust the clock to a network time for the network, such as the TSN. The apparatus may also include a detector coupled to the processing circuitry and the clock circuitry. The detector monitors operations of the clock manager (e.g., the inputs and/or outputs) to detect abnormal behavior indicative of a corrupted or compromised software component. For instance, the detector is operative to receive or intercept the clock manager control information, generate model control information based on a clock model, compare the clock manager control information with the model control information to generate difference information, and determine whether to generate an alert based on the difference information. Other embodiments are described and claimed.

FIG. 1A depicts a time sensitive network (TSN) 102 implemented according to a TSN standard (e.g., IEEE 1588, IEEE 802.1AS, IEEE 802.1Qbv, IEEE 802.15.4, or the like). As depicted, TSN 102 includes various TSN nodes 104, such as TSN nodes 104a-d. The TSN nodes 104 may be implemented as different types of nodes for a TSN, such as an origination node, relay nodes, switch nodes or end node. The TSN nodes 104a-d are communicatively coupled via a TSN fabric 114. The TSN fabric 114 can connect the TSN nodes 104a-d using various types of network topology (e.g., mesh, star, etc.) and various types of communications channels (e.g., wired, wireless, fiber optic, buses, etc.). It is noted that the number of nodes in the TSN 102 is selected for purposes of clarity and not limitation. In practice, the TSN 102 can include any number and combination of nodes (e.g., origination nodes, switches, relay nodes, end devices, etc.).

The TSN nodes 104 can communicate with each other via the TSN fabric 114. For instance, the TSN nodes 104 can send messages 112 to each other over one or more communication channels provided by the TSN fabric 114. The messages 112 can include control information and payload information. One type of control information may include time information. The time information may comprise synchronization messages, time update messages or time follow-up messages (among other time protocol messages) for a time protocol used by the TSN 102.

Each TSN node 104 in the TSN 102 includes various hardware and/or software components. As depicted in FIG. 1A, a TSN 104 includes a clock manager 106, a clock 108 and a detector 110. For instance, the TSN node 104a includes a clock manager 106a, a clock 108a and a detector 110a. The TSN node 104b includes a clock manager 106b, a clock 108b and a detector 110b. The TSN nodes 104c, 104d are similarly configured. It may be appreciated that these are just a few components for a TSN 104, and the TSN 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

In various embodiments, the clock manager 106 is implemented as a software component, and the clock 108 is implemented as a hardware component (e.g., "hardware clock" or "clock circuitry"). The detector 110 can be implemented as a software component, a hardware component, or a combination of both software and hardware components. Embodiments are not limited in this context.

The clock manager 106 generally manages a time (e.g., clock signals) generated by the clock 108. A key component in clock synchronization mechanisms is the clock manager software. In a time sensitive network such as the TSN 102, this component tightly interacts with network hardware (e.g., Ethernet/Wi-Fi) to obtain Precision Time Protocol (PTP) message timestamps, as well as with PTP clock hardware to implement suitable phase/frequency corrections in order to synchronize with a clock leader. The clock manager 106 typically implements a "clock servo." A clock servo is a control algorithm that periodically takes as input some measurement (or estimate) of clock offset to a reference clock, and computes as output either time (e.g., phase) or frequency adjustment to compensate for the given offset.

The clock 108 is generally a hardware clock that implements clock circuitry to generate signals for digital electronics implemented by the TSN node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the TSN 102, the clock 108 can be implemented as a PHC, although other hardware clocks can be implemented as well. Embodiments are not limited in this context.

In normal operation, a network interface (not shown) for a TSN node 104 can receive messages 112 that include time information representative of a network time for the TSN 102. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108.

The detector 110 generally monitors the clock manager 106 to detect abnormal or malicious behavior of the clock manager 106. More particularly, the detector monitors the inputs and outputs of the clock manager 106, e.g., control information sent to the clock 108. In the case of a TSN node 104 implementing a Linux operating system, for example, the clock servo is integral to an implementation of the PTP4L clock management module. When the clock manager 106 is implemented as PTP4L, for example, the clock servo is a proportional integral (PI) controller. The operation of this controller can be compromised by adversaries targeting Linux kernel exploits. In return, this gives attackers indirect access to cause system and application malfunction through malicious timekeeping. However, if the clock synchronization process is described using physical models, the detector 110 can implement the physical models as a form of analytical redundancy, such as an equation-based copy of the system. The detector 110 can efficiently and securely execute the physical models at runtime in parallel to the actual system and serve as basis for anomaly/attack detection. While some embodiments instantiate a modeling approach based on the example of PTP4L, it may be appreciated that the framework is not limited to PI-based clock servos. Embodiments are not limited in this context.

Figure 1B:
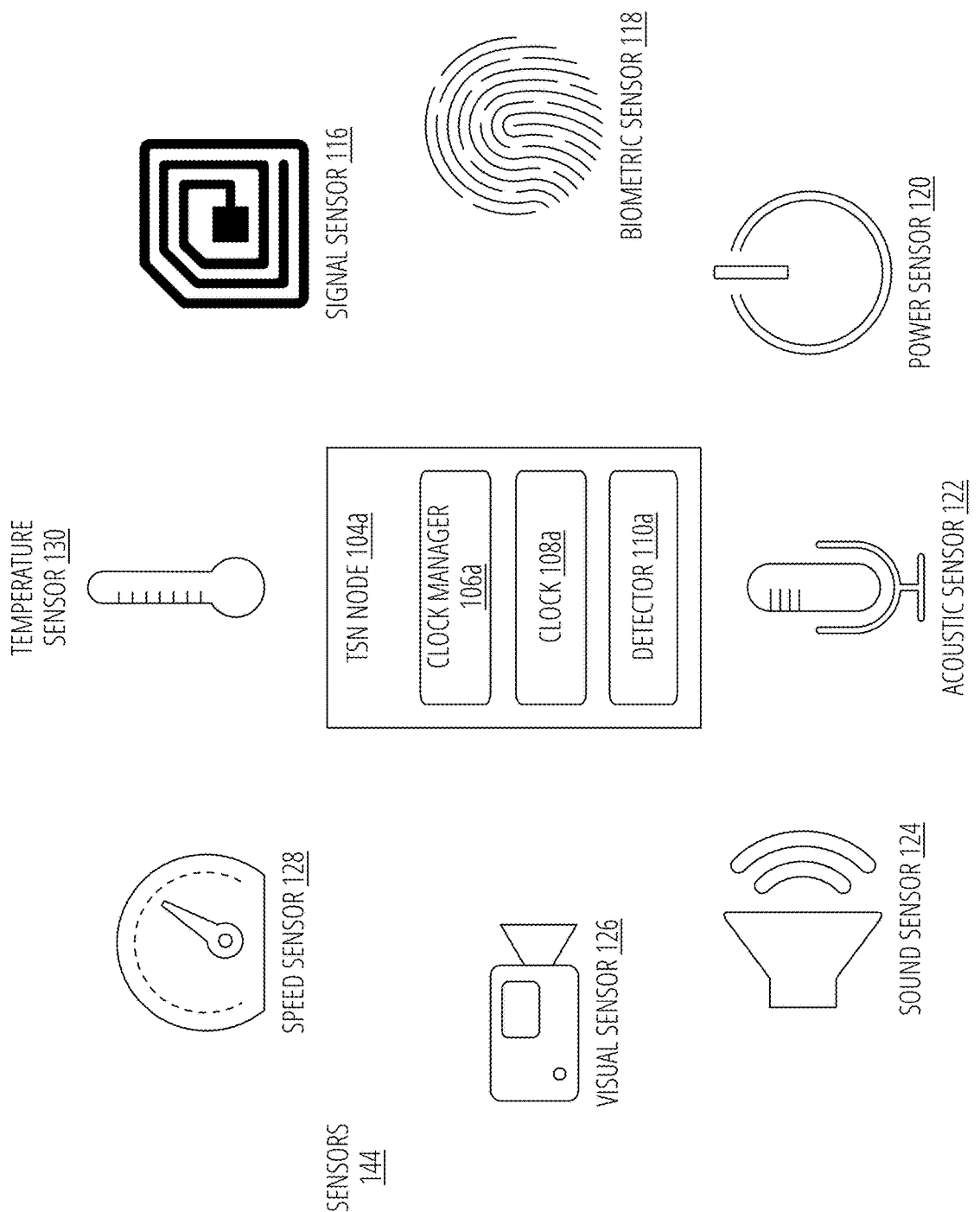
FIG. 1B illustrates an aspect of a TSN 102 for sensors.

FIG. 1B illustrates an example of a TSN node 104a of the TSN 102 designed to control one or more sensors 144. As depicted in FIG. 1B, the TSN node 104 manages various types of sensors 144, such as a signal sensor 116, a biometric sensor 118, a power sensor 120, an acoustic sensor 122, a sound sensor 124, a visual sensor 126, a speed sensor 128, a temperature sensor 130, and so forth. The TSN node 104a may be suitable for implementing a physics-based model for the detector 110. A physics-based approach as proposed herein utilizes state prediction based on physical models of system dynamics. Unlike conventional information-based security measures, the physics-based model may utilize physical properties of a system, along with controller state estimation, to enable computationally-inexpensive analytical redundancy. For example, a mathematical model-based replica of the system is simultaneously executed to detect attacks.

Figure 1C:
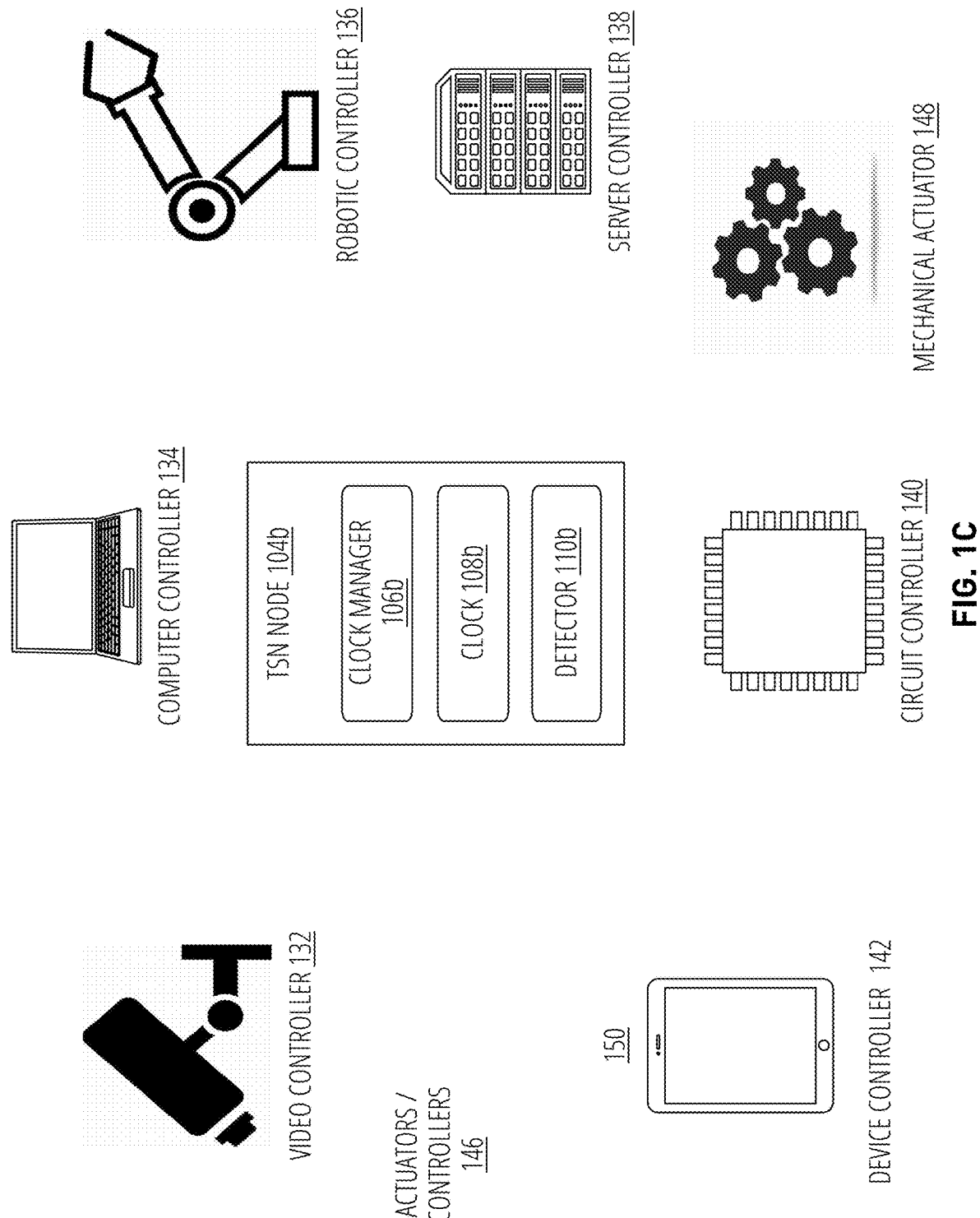
FIG. 1C illustrates an aspect of a TSN 102 for actuators.

FIG. 1C illustrates an example of a TSN node 104b of the TSN 102 designed to control one or more actuators and/or host controllers 146. As depicted in FIG. 1C, the TSN node 104b manages various types of actuators/controllers 146, such as a robotic controller 136, a server controller 138, a mechanical actuator 148, a circuit controller 140, a device controller 142, a video controller 132, a computer controller 134, and so forth. As with FIG. 1B, the TSN node 104b shown in FIG. 1C may be suitable for implementing a physics-based model for the detector 110, as discussed in more detail herein.

In time sensitive networks, such as the TSN 102 depicted in FIGS. 1A-1C, it becomes important for all the TSN nodes 104 to synchronize to a common or shared network time for the TSN 102. For instance, the TSN nodes 104 may operate in accordance with IEEE 802.1AS which implements a hierarchical network to synchronize one or more clock followers (CFs) to a clock leader (CL) through relays or switch nodes. Synchronization is performed through communication of time messages, such as the messages 112. The time messages may comprise, for example, time synchronization messages, time update messages and/or time follow-up messages for a PTP.

In some cases, an attacker may simply attempt to disrupt timing of a single TSN node 104 handling critical functions, such as disrupting one or both of the TSN node 104a managing the sensors 144 and/or the TSN node 104b managing the actuators/controllers 146. Rather than attempting to disrupt timing for the entire TSN 102, the attacker may attempt to attack timing of a single TSN node 104 to disrupt key operations for the TSN node 104, such as an electronic control unit (ECU) to control speed sensing for a vehicle or a controller for a robotic arm in a factory.

In other cases, an attacker may attempt to disrupt timing across the entire TSN 102. To attack or disrupt the TSN 102, an attacker may attempt a timing attack or desynchronization attack to compromise timing for one or more of the TSN nodes 104 in the TSN 102. Assume the TSN node 104c operates as a clock leader (CL) in the TSN 102, and the TSN node 104d operates as a clock follower (CF) in the TSN 102. If an attacker located on a network device (e.g., switch or relay) modifies a critical attribute on a specific port, then all downstream nodes from that network device will suffer a desynchronization event. In this example, if the attacker successfully compromises the TSN node 104c, then the TSN node 104d is vulnerable to a timing attack in the form of receiving messages 112 from the TSN node 104c with erroneous time information. Therefore, it becomes important to detect and localize an attack as quickly as possible. Furthermore, upon detection, it becomes important for the TSN 102 to quickly isolate the compromised network device and thereby prevent the desynchronization attack from spreading to other downstream nodes.

In all cases, a time sensitive network such as the TSN 102 is vulnerable to a timing attack or a desynchronization attack. If a single network node is compromised, it may cause a cascade failure across the entire TSN 102. An example of such an attack is further described with reference to FIGS. 2A, 2B, 3A and 3B.

Figure 2A:
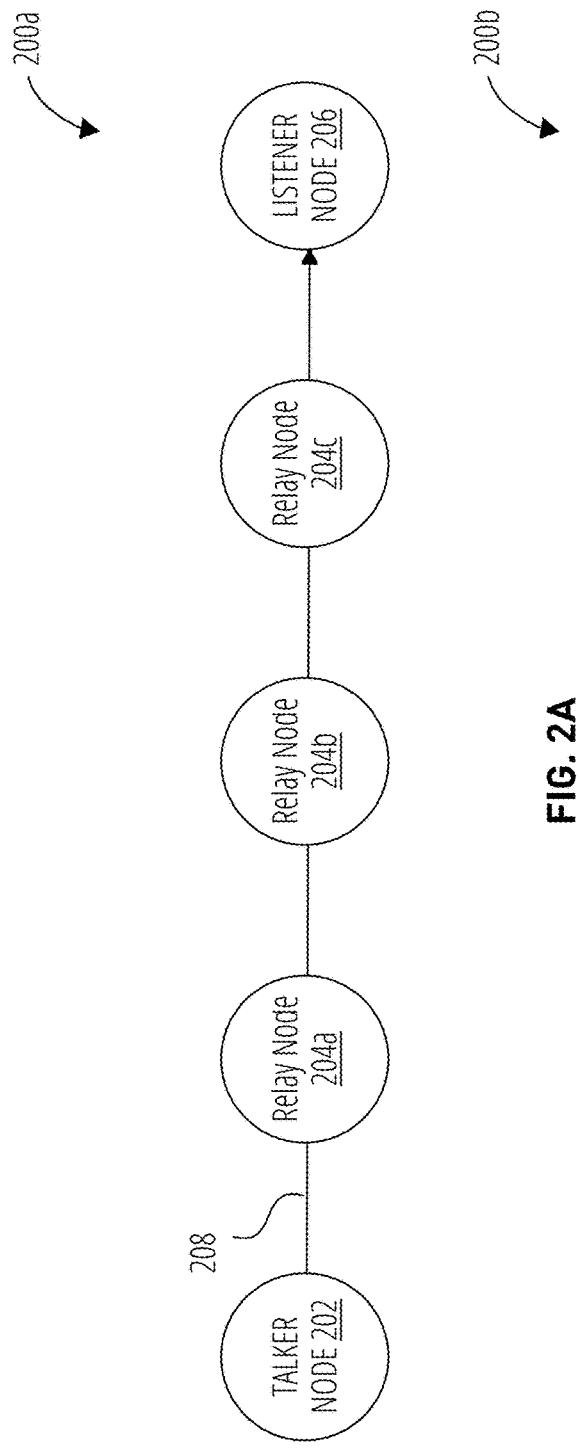

FIG. 2A depicts a TSN 200a implemented according to a TSN standard (e.g., IEEE 1588, IEEE 802.1AS, IEEE 802.1Qbv, or the like). As depicted, the TSN 200a includes talker node 202, relay nodes 204a, 204b, and 204c, and listener node 206, all communicatively coupled via communication channel 208. It is noted that the number of nodes in the TSN 200a is selected for purposes of clarity and not limitation. In practice, the TSN 200a can include any number and combination of nodes (e.g., origination nodes, talker nodes, listener nodes, switches, relay nodes, end devices, etc.). Nodes in the TSN 200a (e.g., talker node 202, listener node 206, relay node 104a, relay node 104b, and relay node 104c, etc.) are provided in a GCL table, which specifies timing for windows in which the nodes can transmit packets on communication channel 208. It is also noted that the terms "switch node" and "relay node" are used interchangeably. For instance, the IEEE 802.AS defines protocol-aware switches as relays.

Relay nodes 204a, 204b, and 204c are time-aware switching nodes and can be any number of devices in a network arranged to communicate information. A talker node 202 sends or originates information and a listener node 206 receives or consumes information. Examples of a talker node 202 or a listener node 206 include devices such as electronic control units in an autonomous vehicle, an industrial system, a medical system, or the like. Additionally, communication channel 208 can be any of a variety of communication channels, including wired or wireless communication channels. In some implementations, all devices in the TSN 200a will receive GCL tables. However, in some implementations, only talker nodes 202 and switching nodes (e.g., relay node 204a, etc.) receive GCL tables while destination devices (e.g., listener node 206) do not receive a GCL table.

Figure 2B:
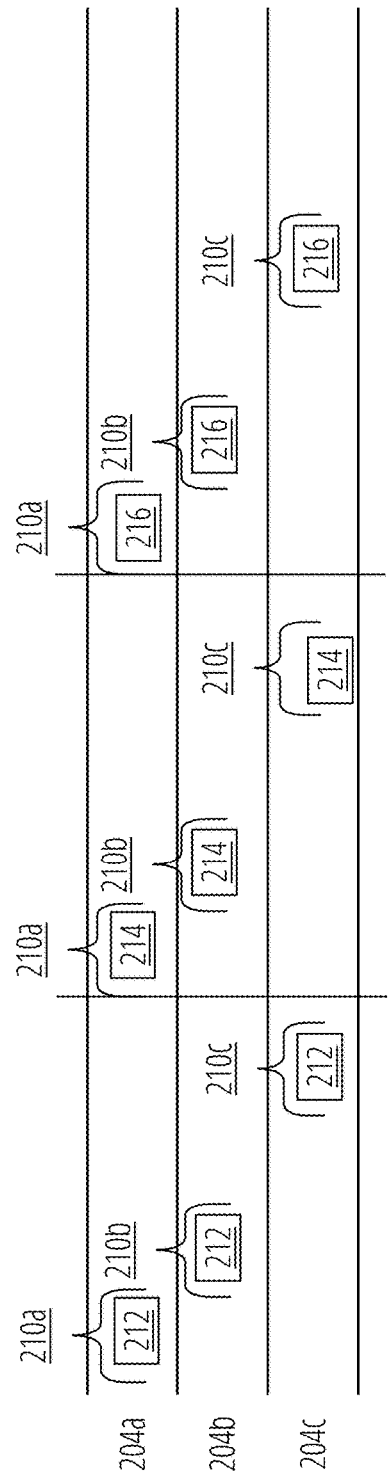
FIG. 2B illustrates an aspect of a timing diagram 200b.

FIG. 2B depicts a timing diagram 200b depicting communication windows (e.g., Qbv windows, or the like) for switches of TSN 200a based on GCL tables. Typically, GCL tables are generated in a network controller (not shown) and are designed to prioritize time critical (TC) traffic and prevent lower priority traffic from accessing communication channel 208, thus guaranteeing the timely delivery of TC packets within pre-configured time windows. In particular, timing diagram 200b depicts Qbv windows 210a, 210b, and 210c in which packets 212, 214, and 216 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 212, etc.) during protected windows (e.g., Qbv window 210a, etc.), nodes in the TSN 200a are time synchronized and scheduled to transmit TC packets (e.g., packet 212, etc.) using non overlapping protected windows (e.g., Qbv window 210a, etc.). It is to be appreciated that providing latency bounded communication (e.g., as depicted in timing diagram 200b) requires tight synchronization of time between nodes in TSN 200a. With such dependency on time synchronization, reliable TSN operation can be disrupted by attacking the timing of the network, sometimes referred to as a desynchronization attack or event.

Figure 3A:
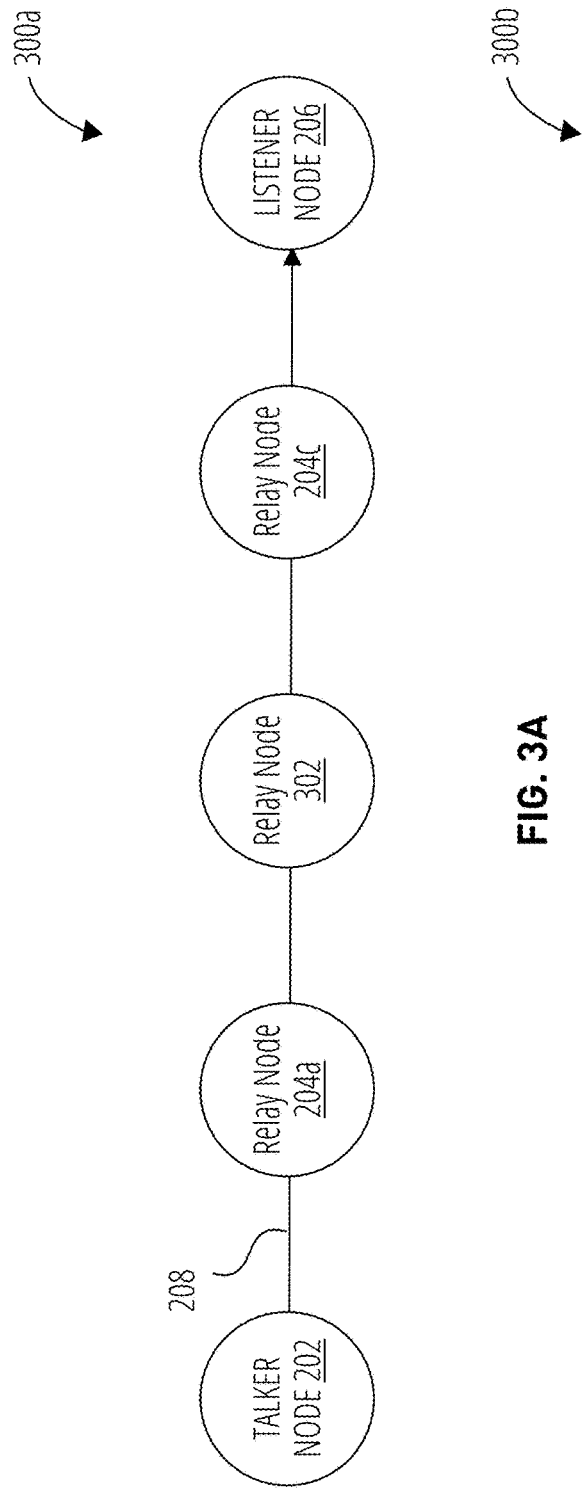

FIG. 3A depicts a TSN 300a, which is like TSN 200a except that the relay node 302 is depicted as compromised. In particular, the clock (not shown) of relay node 302 can be attacked and compromised, thereby causing the Qbv window 210b associated with relay node 302 to be misaligned with respect to, and even overlap with, the protected windows of the other switch nodes in the data stream path (e.g., along communication channel 208).

Figure 3B:
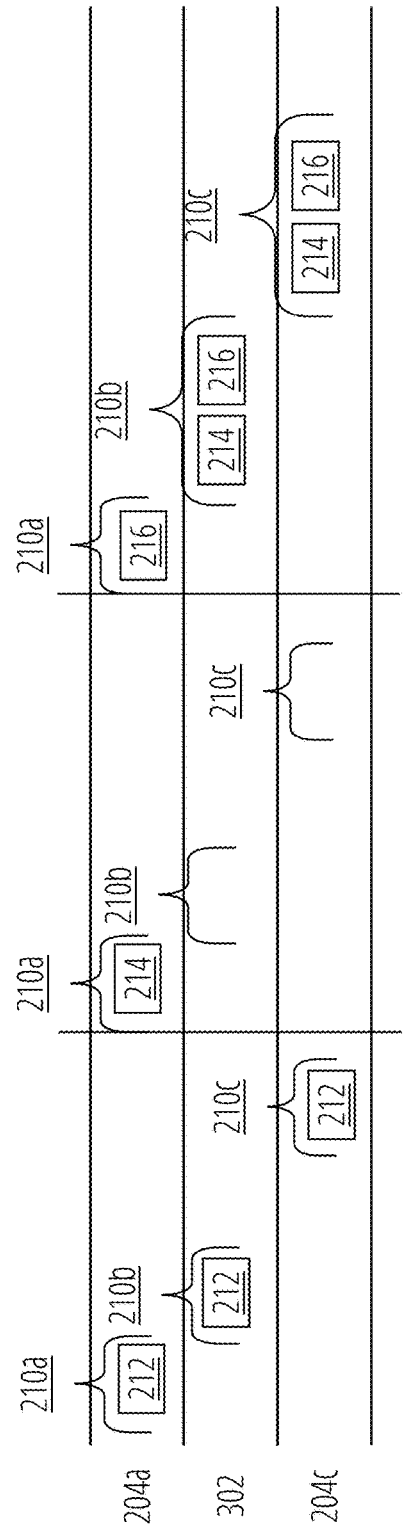
FIG. 3B illustrates an aspect of a timing diagram 300b.
Figure 4:
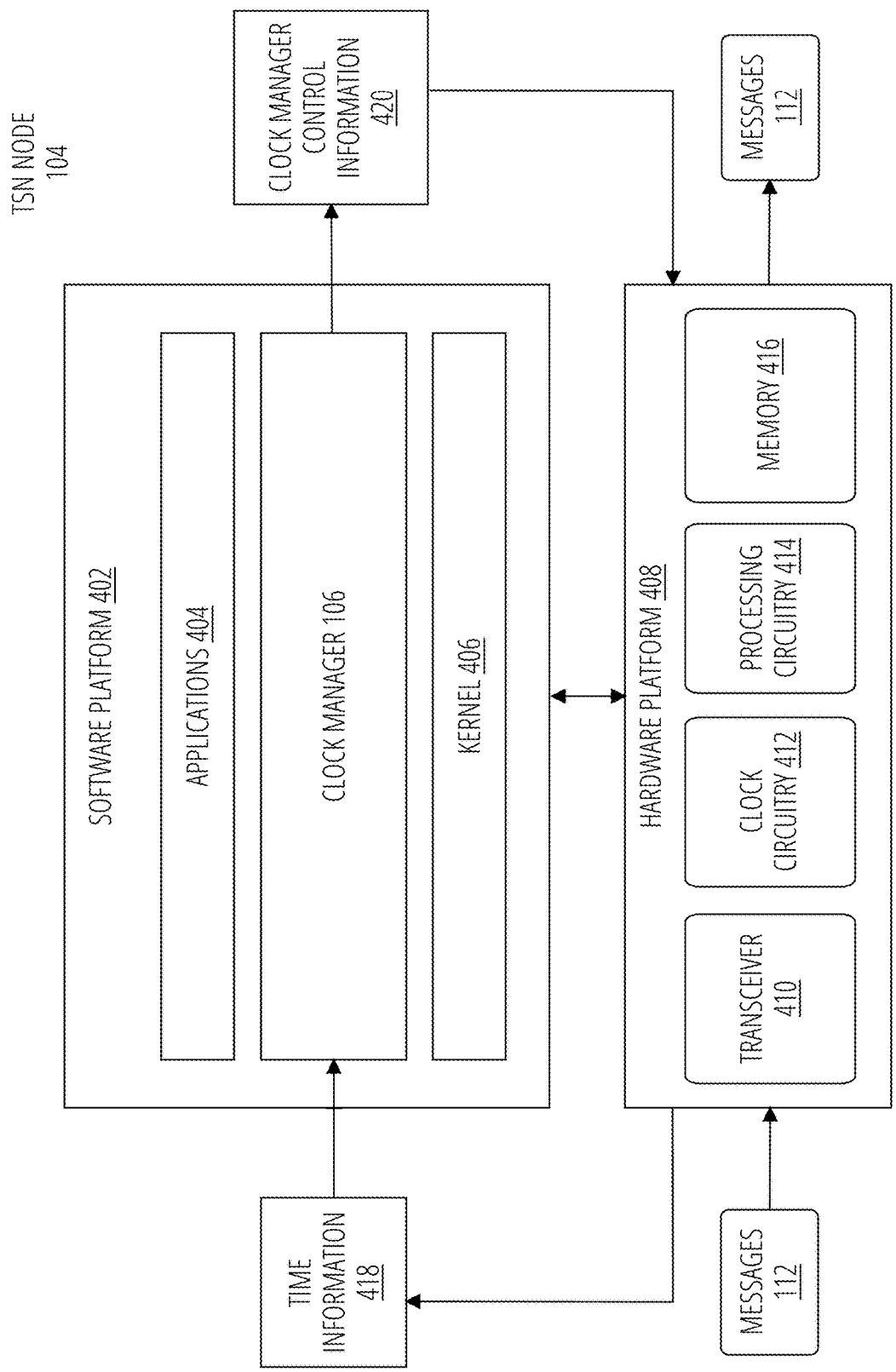
FIG. 4 illustrates an aspect of a TSN node 104.

FIG. 3B depicts timing diagram 300b illustrating Qbv window 210b misaligned with Qbv window 210a and Qbv window 210c and overlapping with Qbv window 210a. As such, packets (e.g., packet 214 in the figure) arrive too late with respect to the attacked switch protected window (e.g., Qbv window 210b) causing them to be buffered and sent in the next protected window. As a result of the delay in transmitting packet 214, relay node 302 breaks the latency bound of the stream that it is serving and can result in errors or comprise the safety of the system in which the nodes are operating FIG. 4 illustrates a more detailed view of a TSN node 104 that implements one or more TSN protocols or standards. The TSN node 104 may be implemented as any network devices suitable for operation within a TSN, such as TSN 102, 200a, 300a, and so forth. The TSN node 104 may be implemented as part of a vehicle, robot, industrial machine or any other devices suitable for a TSN. The TSN node 104 may be implemented as an origination node 202, relay nodes 204a-204c, relay node 302 and/or end node 206. The TSN node 104 may be implemented as either a clock leader (CL) or a clock follower (CF) in a TSN. The TSN node 104 may include interfaces to communicate information with other TSN nodes 104 in the TSN 102, such as messages 112, for example.

The TSN node 104 may operate in accordance with a timing protocol, such as a precision time protocol (PTP) for IEEE 1588, IEEE 802.1AS, IEEE 802.15.4, and so forth. For instance, the TSN node 104 may operate in accordance with IEEE 802.1AS which implements a hierarchical network to synchronize clock followers (CFs) to a clock leader (CL) through relays or switch nodes. Synchronization is performed through communication of time messages, such as the messages 112. The time messages may comprise, for example, time synchronization messages, time update messages or time follow-up messages (among others) for a PTP.

The time messages may include, among other fields and attributes, a correction field, which accumulates a network residence, and an origin timestamp for a CL. The time message may also comprise, for example, a packet delay message type with additional fields and attributes.

As depicted in FIG. 4, the TSN device 104 may include a software platform 402 and a hardware platform 408. The software platform 402 may include, among other software components, one or more applications 404, a clock manager 106, and a kernel 406. The hardware platform 408 may include, among other hardware components, a network interface such as a transceiver 410, clock circuitry 412, processing circuitry 414 and memory 416.

The processing circuitry 414 may include circuitry or processor logic, such as, for example, any of a variety of commercial processors. In some examples, the processing circuitry 414 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 414 may include graphics processing portions and may include dedicated memory, multiple-threaded processing and/or some other parallel processing capability. In some examples, the processing circuitry 414 may be an application specific integrated circuit (ASIC) or a field programmable integrated circuit (FPGA). In some examples, the processing circuitry 414 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 406 may be arranged to form one or more types of memory, such as, for example, dynamic random access memory (DRAM), NAND memory, NOR memory, or the like.

The transceiver 410 may include logic and/or features to support a communication interface. For example, the transceiver 410 may include one or more interfaces that operate according to various communication protocols or standards to communicate over direct or network communication links. Direct communications may occur via use of communication protocols or standards described in one or more industry standards (including progenies and variants). For example, the transceiver 410 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 410 may be arranged to support wireless communication protocols or standards, such as, for example, Wi-Fi, Bluetooth, ZigBee, LTE, 5G, or the like.

The TSN node 104 may also include where the network is a controller area network (CAN) or a vehicle area network (VAN). The TSN node 104 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

In one aspect, the TSN node 104 may be implemented as a CL or CF for the TSN 102. As previously discussed, the clock manager 106 may ensure that the clock circuitry 412 maintains a network time for the TSN 102. When operating in a CL role, the clock manager 106 may send a message 112 with time information 418 representing a current network time to one or more nodes operating in a CF role for the TSN 102. When operating in a CF role, the clock manager 106 may receive a message 112 from a CL node. The clock manager 106 may use the time information 418 from the message 112 to synchronize a local device time with the current network time maintained by the clock circuitry 412. The clock manager 106 analyzes the time information 418, and determines whether to adjust a parameter (e.g., phase or frequency) of the clock circuitry 412 to synchronize the clock circuitry 412 to the current network time.

Figure 5A:
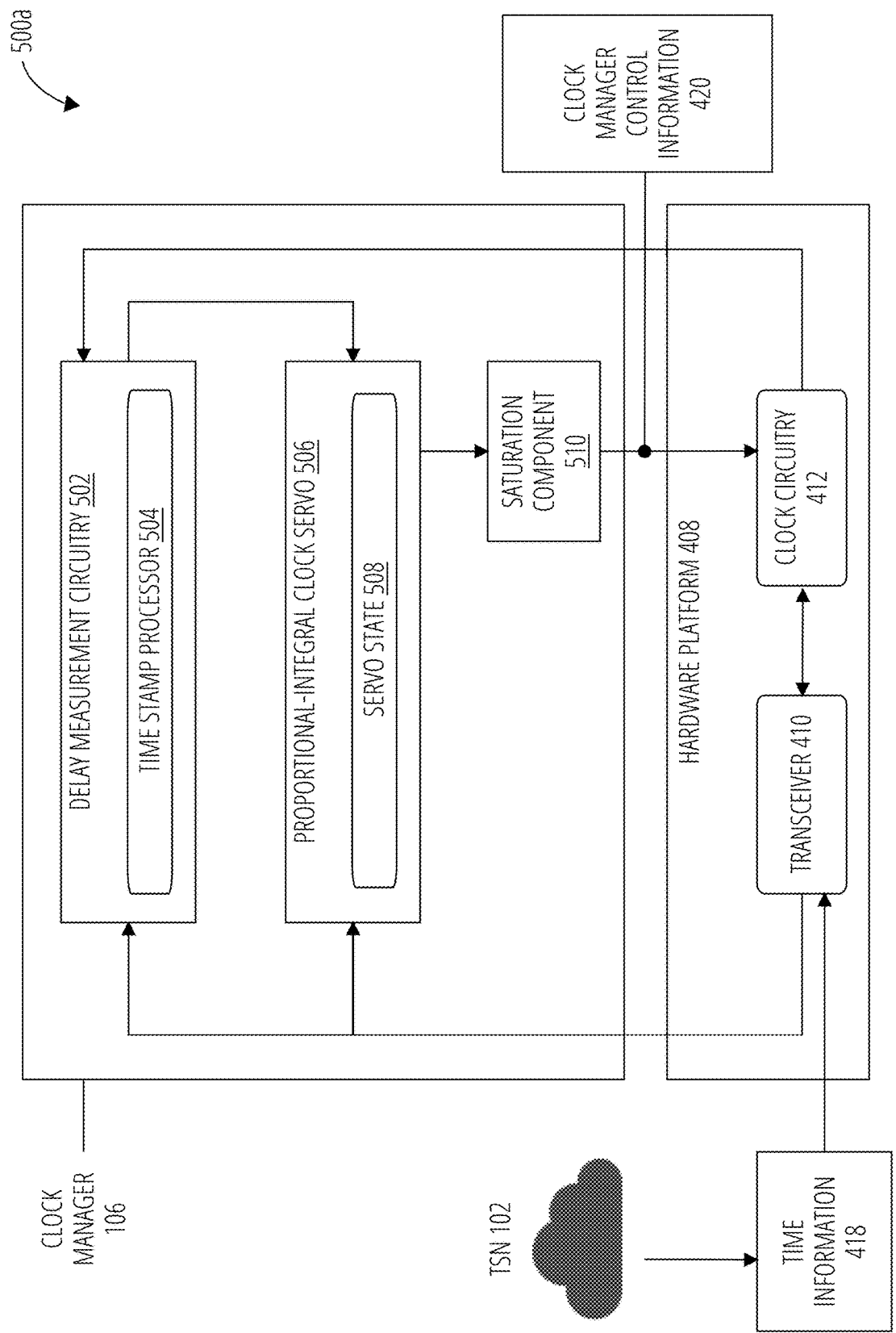

FIG. 5A illustrates a more detailed view for a clock manager 106 suitable to implement various aspects of the embodiments. As previously discussed, the clock manager 106 is a key component in clock synchronization mechanisms. The clock manager 106 tightly interacts with the transceiver 410 to obtain PTP message timestamps from the time information 418 received via messages 112 from a CL node in the TSN 102. The clock manager 106 then outputs clock manager control information 420 to the hardware platform 408. The clock manager control information 420 may represent suitable phase/frequency corrections in order to synchronize the clock circuitry 412 with a network time maintained by the CL.

As depicted in FIG. 5A, the clock manager 106 is an example of a PTP4L implementation that includes delay measurement circuitry 502 with a time stamp processor 504. The clock manager 106 further includes a proportional-integral clock servo 506 that maintains a servo state 508. The clock manager 106 also includes a saturation component 510.

The proportional-integral clock servo 506 is generally a control algorithm that periodically takes as input some measurement (or estimate) of clock offset to a reference clock, and computes as output either time (e.g., phase) or frequency adjustment to compensate for the given offset. When the kernel 406 is implemented as a Linux operating system, for example, the clock manager 106 and the proportional-integral clock servo 506 can be implemented as a PTP4L clock management module. However, embodiments are not limited to this example.

The delay measurement circuitry 502 and/or the proportional-integral clock servo 506 periodically takes as input a correction feature from a correction field in the time information 418 contained within messages 112 received by the transceiver 410.

The delay measurement circuitry 502 receives as input raw time measurements (e.g., path or link delay (pdelay) or sync/follow-up message talker origin/listener ingress timestamps) from the time information 418 and performs filtering operations to reduce measurement noise from the raw time measurements. This is because using raw or unfiltered measurements may adversely impact decisions made by the proportional-integral clock servo 506. In one embodiment, filtering is implemented as a sliding window average, where a default window length is set as 10 seconds or 80 samples for a default synchronization/follow-up period.

Filtered pdelay measurements of the time stamp processor 504 may be used to compute time offsets from a CL clock, such as clock circuitry 412 for a TSN node 104 that operates in a CF role for the TSN 102. In some cases, however, the time stamp processor 504 may alternatively give raw pdelay measurements where the filtering component is disabled. Additionally, the delay measurement circuitry 502 can compute a rate ratio, or ratio of CL clock and CF clock frequencies, based on synchronization/follow-up message timestamps (e.g., t1, t2, t3, . . . , tn).

The proportional-integral clock servo 506 may receive the filtered pdelay measurements, rate ratio, and time offset as inputs, and use the inputs to compute clock manager control information 420 for the clock circuitry 412. The clock manager control information 420 may comprise, for example, a phase or frequency adjustment for the clock circuitry 412.

Before the proportional-integral clock servo 506 sends the clock manager control information 420 to the clock circuitry 412, the proportional-integral clock servo 506 outputs the clock manager control information 420 to the saturation component 510. The saturation component 510 performs final adjustments to clock manager control information 420, such as ensuring the clock manager control information 420 does not adjust a frequency parameter for the clock circuitry 412 too quickly or beyond a maximum frequency. The saturation component 510 then outputs the clock manager control information 420 to the hardware platform 408.

Despite the many advantages of implementing a clock manager 106 as a PTP4L proportional-integral controller, this implementation presents security concerns. For instance, the operation of this type of controller can be compromised by adversaries targeting Linux kernel exploits. In return, this gives attackers indirect access to cause system and application malfunction through malicious timekeeping. The attacker may influence the clock circuitry 412 by gaining execution privileges in the software domain (e.g., ring 0 and above) and altering behavior of the PTP4L software components of the clock manager 106. This may ultimately cause clock circuitry 412 misbehavior.

The attack can impact a TSN node 104 in many ways. Some examples are as follows. A first attack vector can be through sensing, where the attacker attempts to modify timing values that contribute to pdelay and offset computation before they are consumed by the proportional-integral clock servo 506. Another attack vector can be through control, where the attacker attempts to modify the control code computing actuation (e.g., frequency adjustment) based on sensing (e.g., offset). A third attack vector could be through actuation, where the attacker attempts to modify frequency adjustment values computed by the proportional-integral clock servo 506 and sent to the clock circuitry 412 for implementation. Examples of security vulnerabilities for the clock manager 106 are further described with reference to FIGS. 5B-5D.

Figure 5B:
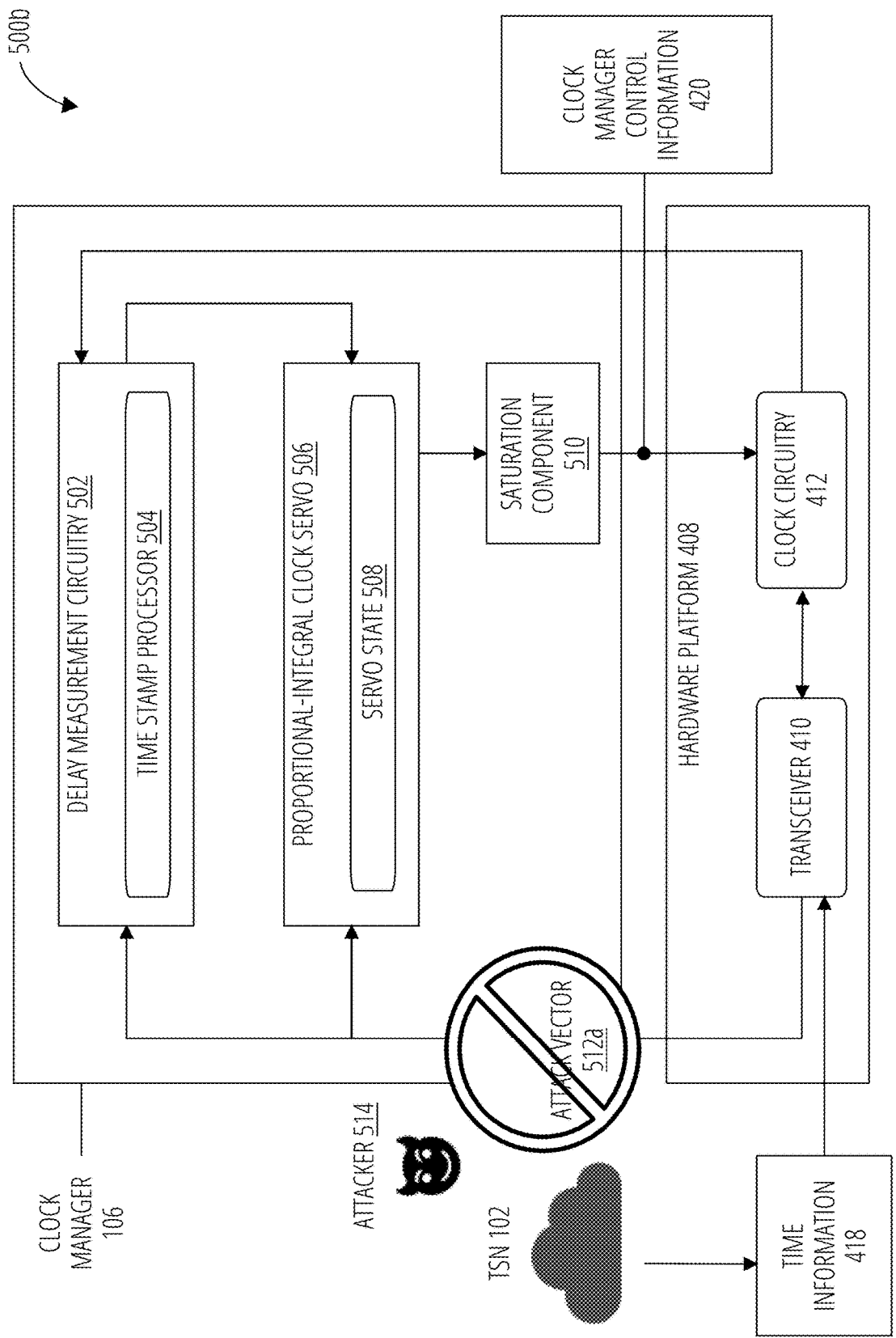
FIG. 5B illustrates an aspect of an apparatus 500b.

FIG. 5B illustrates the clock manager 106 under a first attack scenario. As depicted in FIG. 5B, assume an attacker 514 attempts a first attack vector 512a through sensing. The attacker 514 may attempt to modify timing values in the time information 418 after receipt by the transceiver 410 and before they are consumed by the proportional-integral clock servo 506. In other words, the first attack vector 512a is on input values for the clock manager 106.

Figure 5C:
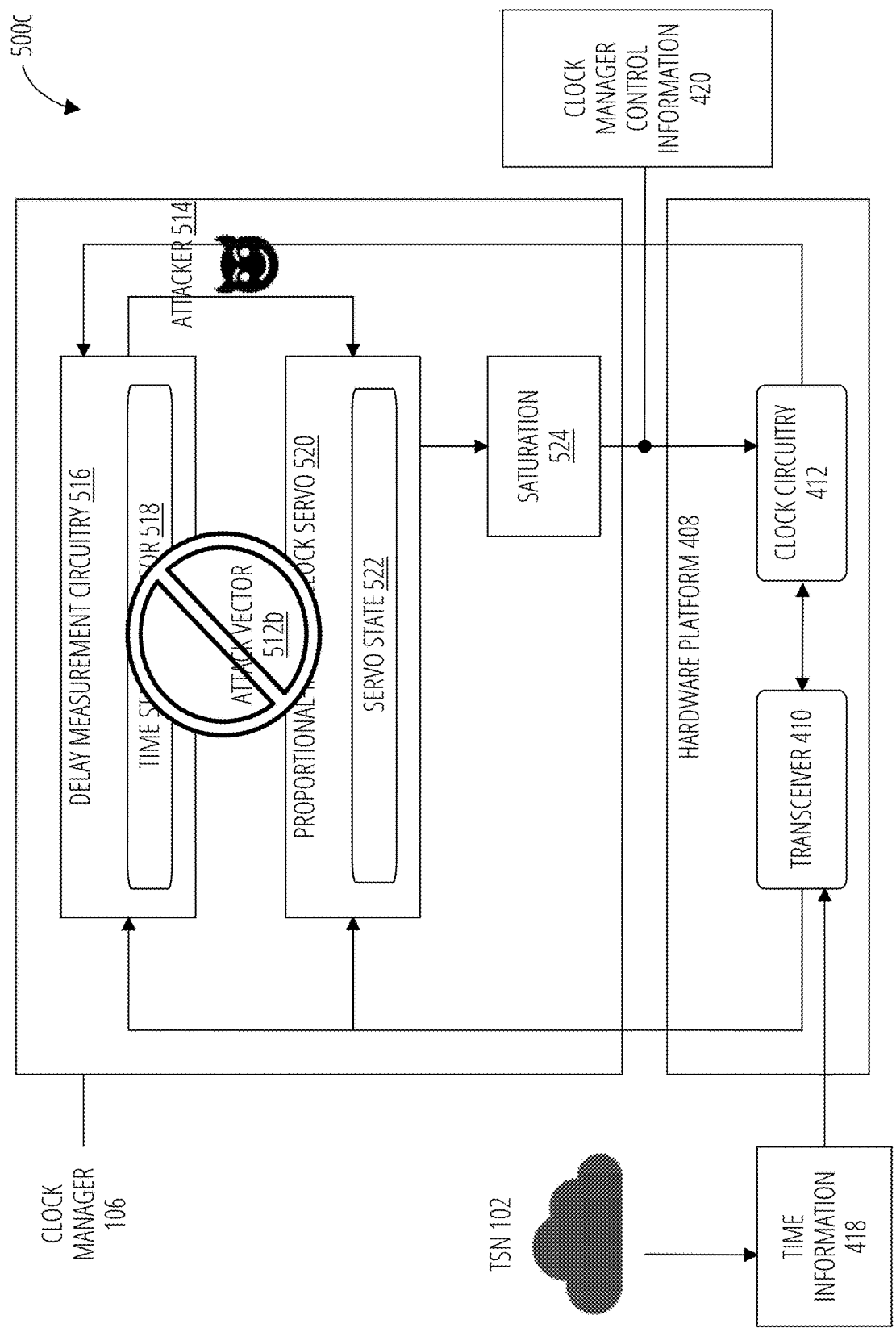
FIG. 5C illustrates an aspect of an apparatus 500c.

FIG. 5C illustrates the clock manager 106 under a second attack scenario. As depicted in FIG. 5C, assume the attacker 514 attempts a second attack vector 512b through control. The attacker 514 may attempt to modify the control code computing actuation (e.g., frequency adjustment) based on sensing (e.g., offset). In other words, the second attack vector 512b is on the actual code used to implement the clock manager 106.

Figure 5D:
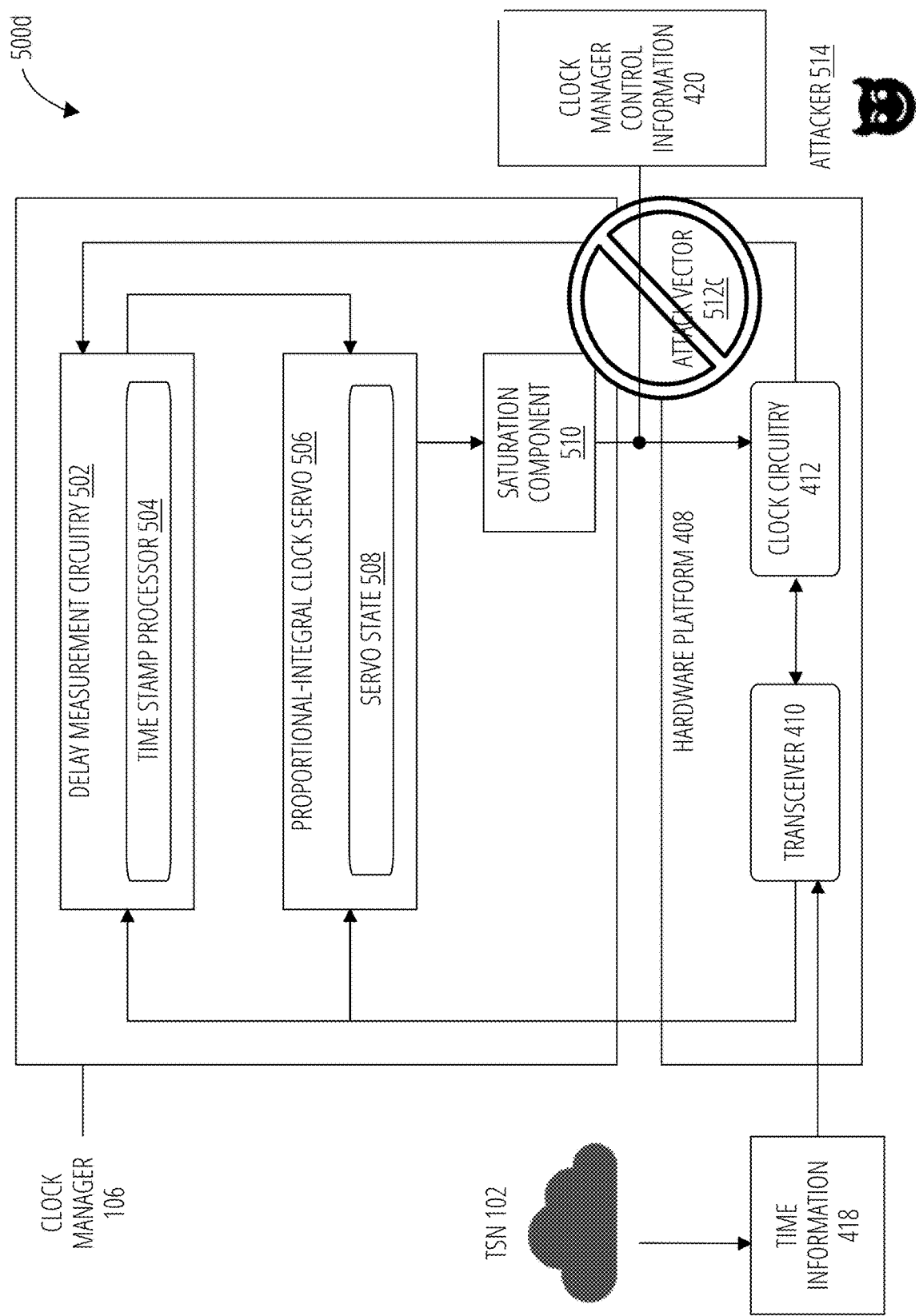
FIG. 5D illustrates an aspect of an apparatus 500d.

FIG. 5D illustrates the clock manager 106 under a third attack scenario. As depicted in FIG. 5D, assume the attacker 514 attempts a third attack vector 512c through actuation. The attacker 514 may attempt to modify frequency adjustment values of the clock manager control information 420 as computed by the proportional-integral clock servo 506 and sent to the clock circuitry 412 for implementation. In other words, the third attack vector 512c is on output values from the clock manager 106.

As illustrated in FIGS. 5A-5D, implementation of a clock manager 106 as a PTP4L proportional-integral (PI) controller presents several security concerns. However, if the clock synchronization process is described using physical models, these models can be employed as analytical redundancy, such as an equation-based copy of the system. The models can be efficiently executed at runtime in parallel to the actual clock manager 106, and serve as a basis for anomaly/attack detection. While some embodiments instantiate a modeling approach on the example of a PTP4L clock manager, it may be appreciated that the framework is not limited to PI-based clock servos.

Figure 6:
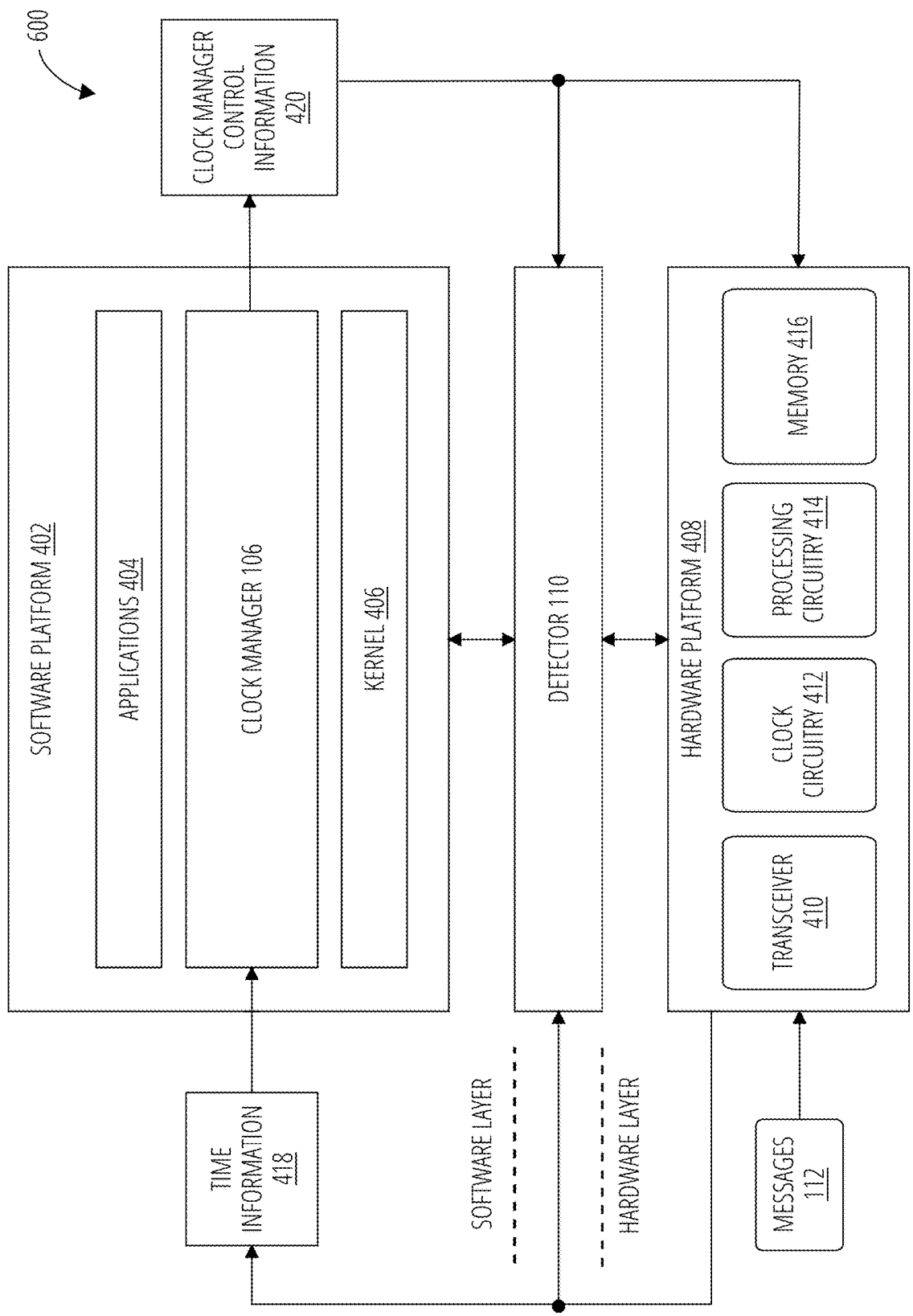
FIG. 6 illustrates an aspect of an apparatus 600.

FIG. 6 illustrates an apparatus 600. Similar to the apparatus 400, the apparatus 600 includes a software platform 402 and a hardware platform 408. In addition, the apparatus 600 includes a detector 110 to monitor a clock manager 106 of the software platform 402. As previously discussed, the detector 110 generally monitors the clock manager 106 to detect abnormal or malicious behavior of the clock manager 106. More particularly, the detector 110 monitors the inputs and/or outputs of the clock manager 106, such as consuming the time information 418 sent from the transceiver 410 to the clock manager 106 as input, and the clock manager control information 420 sent from the clock manager 106 to the clock circuitry 412 as output.

As depicted in FIG. 6, the apparatus 600 includes a clock circuitry 412 to implement a hardware clock (e.g., a PHC) for a device, such as a TSN node 104. The apparatus 600 includes a processing circuitry 414 coupled to the clock circuitry 412, the processing circuitry 414 to execute instructions to perform operations for a clock manager 106. The clock manager 106 is operative to receive messages 112 with time information 418 for a network, such as TSN 102. The clock manager 106 generates clock manager control information 420 to adjust the clock circuitry 412 to a network time for the TSN 102. The clock manager control information 420 may comprise one or more parameters to adjust the clock circuitry 412 for the apparatus 600. The one or more parameters may represent, for example, adjustments to a phase or frequency of the clock circuitry 412. For example, the clock manager control information 420 may comprise a phase or frequency adjustment based on a time offset between a reference time and a time maintained by the clock circuitry 412. The reference time is based on the time information 418 in at least one message 112.

The apparatus 600 further includes a detector 110 coupled to the processing circuitry 414 and the clock circuitry 412. In one embodiment, the detector 110 may be implemented as part of a software layer for the apparatus 600, such as the software platform 402. In another embodiment, the detector 110 may be implemented as part of a hardware layer for the apparatus 600, such as the hardware platform 408. In yet another embodiment, certain elements of the detector 110 may be implemented in the software platform 402, while other elements of the detector 110 may be implemented in the hardware platform 408. Embodiments are not limited in this context.

Although FIG. 6 depicts the detector 110 implemented as part of the apparatus 600, it may be appreciated that the detector 110 may be implemented by another apparatus, device or system communicatively coupled to the apparatus 600. For instance, the detector 110 may be implemented as part of an intrusion detection system (IDS) for the apparatus 600 that is separate from the apparatus 600 or a device other than a device that implements the apparatus 600. For instance, if the apparatus 600 is implemented by a TSN node 104a, the detector 110 of the apparatus 600 could optionally be implemented in a TSN node 104b. The detector 110 could also be implemented by an IDS communicatively coupled to the TSN node 104, either directly via a wired or wireless connection, or indirectly via the TSN fabric 114. Embodiments are not limited in this context.

The detector 110 is operative to consume the clock manager control information 420 in transit from the clock manager 106 of the software platform 402 and the hardware platform 408. For instance, the detector 110 can consume software control messages, or it can have one or more taps on a hardware bus or signal lines used to communicate electrical signals to the hardware platform 408. The detector 110 analyzes the clock manager control information 420, and determines whether to generate an alert or take corrective action for the apparatus 600 based on results of the analysis.

Figure 7:
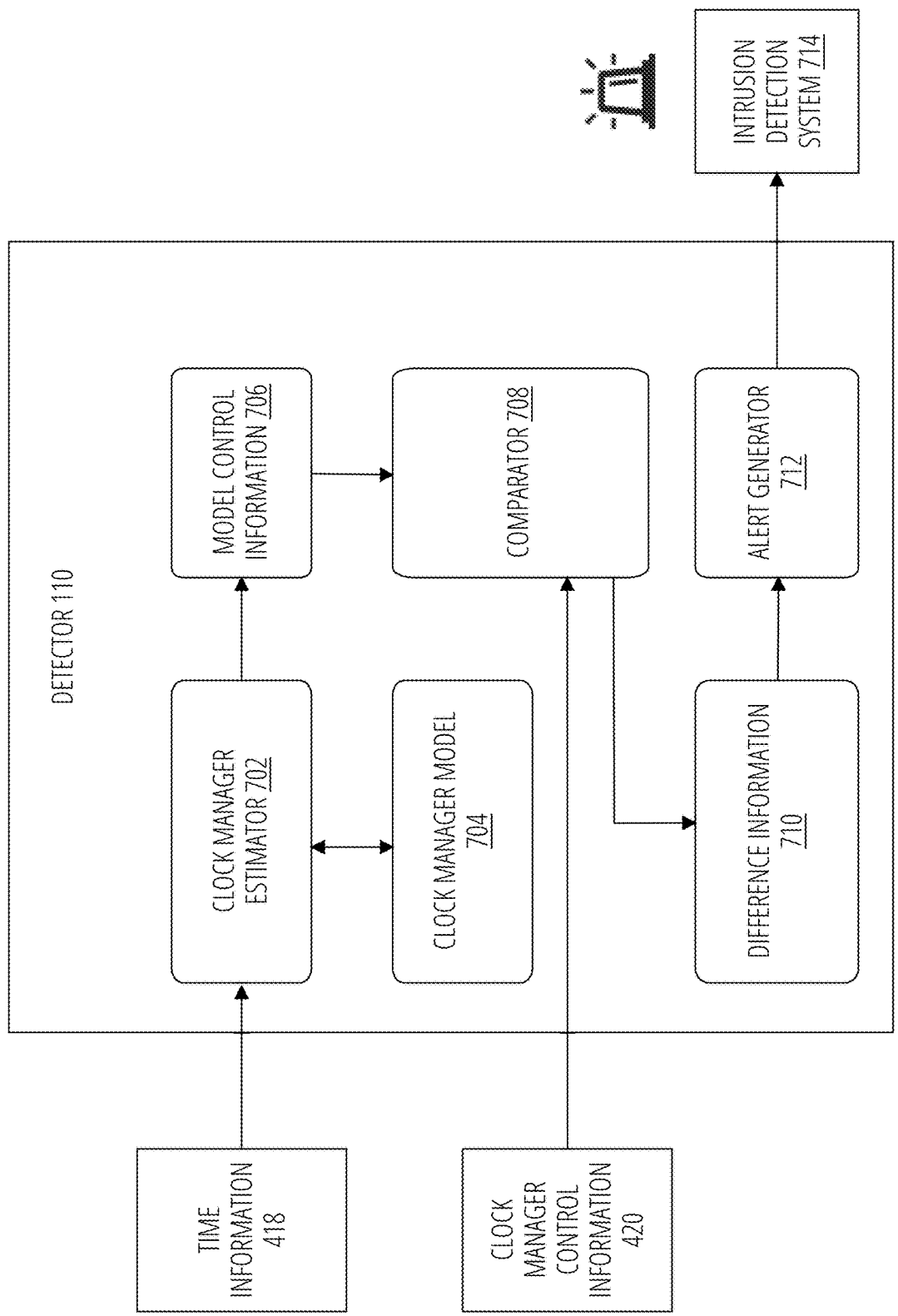
FIG. 7 illustrates an aspect of a detector 110.

FIG. 7 illustrates a more detailed view of a detector 110. As depicted in FIG. 7, a detector 110 may include a clock manager estimator 702, a clock manager model 704, model control information 706, a comparator 708, difference information 710, and an alert generator 712. The detector 110 can be communicatively coupled to an intrusion detection system 714.

In operation, the detector 110 receives at least two inputs. The two inputs include the time information 418 from the transceiver 410 and the clock manager control information 420 from the clock manager 106. The clock manager estimator 702 receives the time information 418, and uses the time information 418 to generate model control information 706 based on a set of equations and algorithms implemented for the clock manager model 704.

In general, the detector 110 attempts to generate model control information based on a behavior of the clock manager 106. The detector 110 may generate model control information in a number of different ways. For instance, as previously discussed, the detector 110 may use different statistical models in an attempt to model behavior of the clock manager 106. However, statistical models are typically compute-intensive and memory-intensive and may not be suitable for real-time threat monitoring.

As described with reference to FIGS. 5A-D, the clock manager 106 may be implemented as a PTP4L clock manager software module. The PTP4L clock manager software module is a physics-based controller, which is derived based on control theoretic principles, as is the case with most prominent clock servos for Linux. Since the proportional-integral clock servo 506 is a physics-based controller, an optimal modeling technique is a physics-based one. Any other technique, such as those based on statistical behavior, will likely be suboptimal for security operations.

In one embodiment, the detector 110 may implement a clock manager model 704 that comprises a physics-based analytical model to represent physical relationships between components of a system. The physics-based analytical model is implemented as an equation-based representation of a behavior of the clock manager 106. More particularly, the physics-based analytical model is implemented as an equation-based representation of a clock servo controller, such as the proportional-integral clock servo 506, as well as the time stamp processor 504 and the delay measurement circuitry 502. The clock manager model 704 will be described in more detail with reference to FIG. 8.

Referring again to FIG. 7, the comparator 708 receives as input the model control information 706 from the clock manager estimator 702, as well as the clock manager control information 420 from the clock manager 106. The comparator 708 compares the clock manager control information 420 with the model control information 706 to generate difference information 710. The difference information 710 is basically a differential or residual between the clock manager control information 420 and the model control information 706.

The alert generator 712 receives the difference information 710 as input. The alert generator 712 determines whether to generate an alert based on the difference information 710. For instance, the alert generator 712 of the detector 110 is operative to determine whether to generate an alert based on the difference information 710, the alert generator 712 to compare the difference information 710 measured periodically to a defined threshold representing a value in parts per billion (ppb) for frequency adjustment, or nanoseconds (ns) for phase adjustment. More particularly, the alert generator 712 of the detector 110 is operative to determine whether to generate an alert based on the difference information 710, the detector 110 to compare the difference information 710 measured every synchronization cycle to a defined threshold represented in units of ppb for frequency adjustment, the defined threshold to be equal to or greater than 0.1 ppb, 1 ppb, 5 ppb, 10 ppb, and so forth. Similarly, the detector 110 can compare the difference information 710 measured to a defined threshold represented in units of nanoseconds (ns) for phase adjustment. Other measurement periods and values for defined thresholds may be implemented based upon a number of factors, such as a given software platform 402, hardware platform 408, transceiver 410, applications 404, level of operational security, real-time detection, off-line detection, and other considerations.

Figure 8:
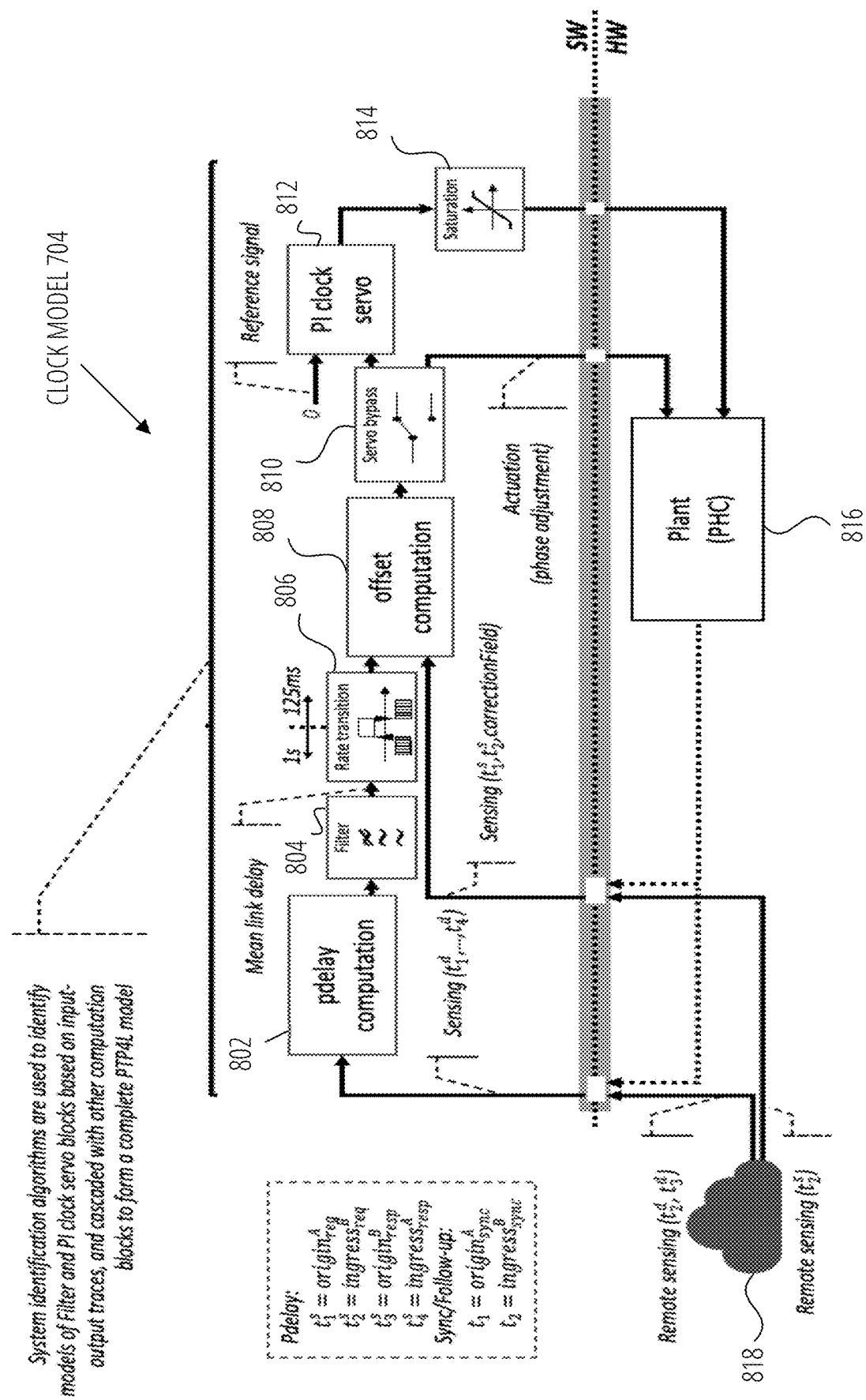
FIG. 8 illustrates an aspect of a clock manager model 704.

FIG. 8 represents a block diagram for a clock manager model 704. As previously discussed, in order to derive an analytical model based on physical relationships, an understanding of the equivalents of sensing, control, and actuation signals in the case of the clock manager 106 is needed. Herein, the clock manager 106 is a controller, receiving some sensing inputs determining the offset between clocks, and computing an actuation signal that is driving the clock hardware.

FIG. 8 shows a PTP4L follower control block diagram developed from a physics-aware control perspective. System identification algorithms are used to identify models of various control blocks, such as filter and PI clock servo control blocks, based on input-output traces. The identified control blocks are cascaded with other computation blocks to form a complete PTP4L model.

As described with reference to FIGS. 5A-D, for example, three main components in a PTP4L system are the network interface hardware (e.g., transceiver 410), the PTP hardware clock (PHC) (e.g., clock circuitry 412) and the PTP4L software module (e.g., clock manager 106). The various control blocks used to model these three main components are shown in FIG. 8.

More particularly, a model software layer for a clock manager 106 includes various control blocks, such as a pdelay computation 802, a filter 804, a rate transition 806, an offset computation 808, a servo bypass 810, a PI clock servo 812, and a saturation 814. A model hardware layer may also include various control blocks, such as for the transceiver 410 and the clock circuitry 412, which includes a network interface 818 and a PHC 816, respectively.

In model operation, protocol messages for path/link delay (pdelay) estimation are received from the network interface 818 with a default periodicity of 1 second (s) (in PTP4L), while the sync/follow-up exchange repeats are received with a default of every 125 milliseconds (ms) (in PTP4L). The pdelay computation 802 receives this information as input and generates a pdelay estimate. The filter 804 receives the pdelay estimate and performs filtering to reduce measurement noise as using raw/unfiltered measurements may adversely impact servo decisions. The rate transition 806 manages transitions between the periodicity of the pdelay estimates and sync/follow-up estimates (e.g., of 1 s and 125 ms, respectively).

The offset computation 808 receives the filtered pdelay measurements, and computes an offset between a clock of a CF node and a clock of a CL node. In some cases, however, raw pdelay can also be used (e.g., filtering disabled). In general, the configuration of the model would match that of the PTP4L module. Additionally, based on sync/follow-up message timestamps (e.g., t1, t2, t3, t4), a rate ratio, or ratio of CL clock frequencies and CF clock frequencies, is computed. The offset computation 808 outputs the filtered pdelay, rate ratio and offset values to the PI clock servo 812 via the servo bypass 810. The servo bypass 810 ensures the output from the offset computation 808 is above one or more threshold values to trigger input to the PI clock servo 812. If below (or equal to) the one or more threshold values, the servo bypass 810 outputs the values directly to the PHC 816 for phase adjustments to the PHC 816. If above (or equal to) the one or more threshold values, the servo bypass 810 outputs the values to the PI clock servo 812 for further processing. For instance, if a time offset spans beyond 1 s, the servo bypass 810 ensures that the proportional-integral control law is bypassed and a rough phase correction is implemented directly to the PHC 816.

The PI clock servo 812 receives a reference signal as a first input, and the filtered pdelay, rate ratio, and offset values as a second input. The PI clock servo 812 uses the first and second inputs to compute a phase or frequency adjustment to be applied (e.g., actuated) on the PHC 816. If the time offset spans beyond 1 s, proportional-integral control law is bypassed and a rough phase correction is implemented directly to the PHC 816. Otherwise, the PI clock servo 812 is locked, and the frequency adjustment is computed based on the proportional-integral algorithm.

Figure 9:
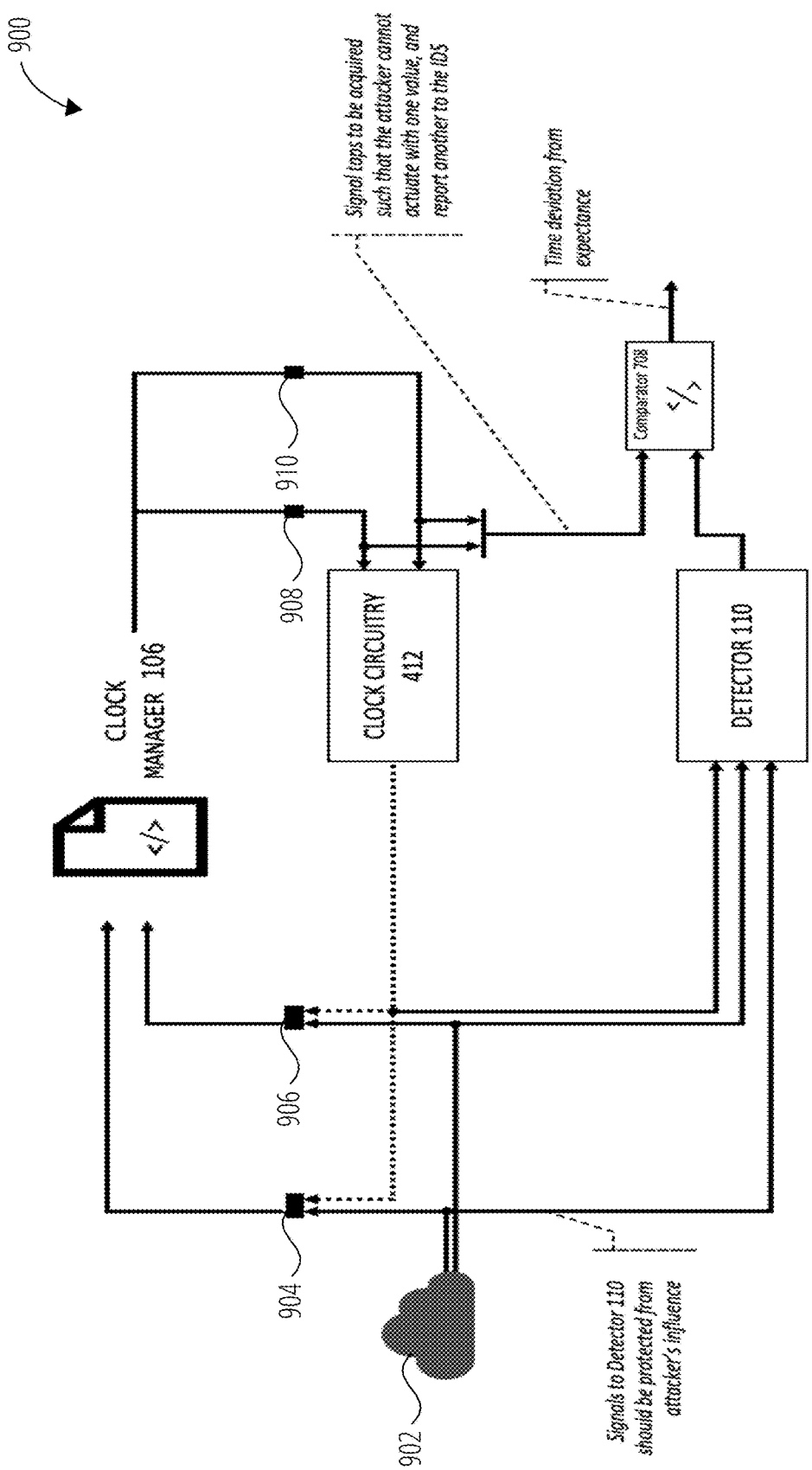
FIG. 9 illustrates an aspect of a proportional-integral (PI) clock servo 812.

FIG. 9 illustrates an apparatus 900. The apparatus 900 is similar to apparatus 600, and focuses on a subset of components relative to the apparatus 600. As depicted in FIG. 9, the apparatus 900 includes the clock manager 106, the clock circuitry 412, the detector 110, the comparator 708, and a network interface 902.

The apparatus 900 illustrates the detector 110 receiving as input time information 418 (not shown) received by the network interface 902 via a set of taps 904, 906. The direct taps 904, 906 reduce a risk that signals received by the network interface 902 and sent as input to the detector 110 are under influence of an attacker. For instance, an attacker may attempt to intercept and modify the time information 418 to affect sensing by the clock manager 106 of one set of values, and report another set of values to the detector 110. The direct taps 904, 906 reduces this risk and thereby improves security for the detector 110.

Similarly, the clock manager 106 outputs clock manager control information 420 (not shown), which is received as input by the comparator 708 via a set of taps 908, 910. The direct taps 908, 910 reduce a risk that signals received as input by the comparator 708 are under influence of an attacker. For instance, an attacker may attempt to intercept and modify the clock manager control information 420 to actuate the clock circuitry 412 with one set of values, and report another set of values to the comparator 708. The direct taps 908, 910 reduce this risk and thereby improve security for the comparator 708 and/or the detector 110.

The comparator 708 receives the clock manager control information 420 (not shown) from the clock manager 106 and model control information 706 (not shown) from the detector 110, compares the information to generate difference information 710 (not shown) or a residual, which represents the deviation from expected behavior of the clock manager 106.

Figure 10:
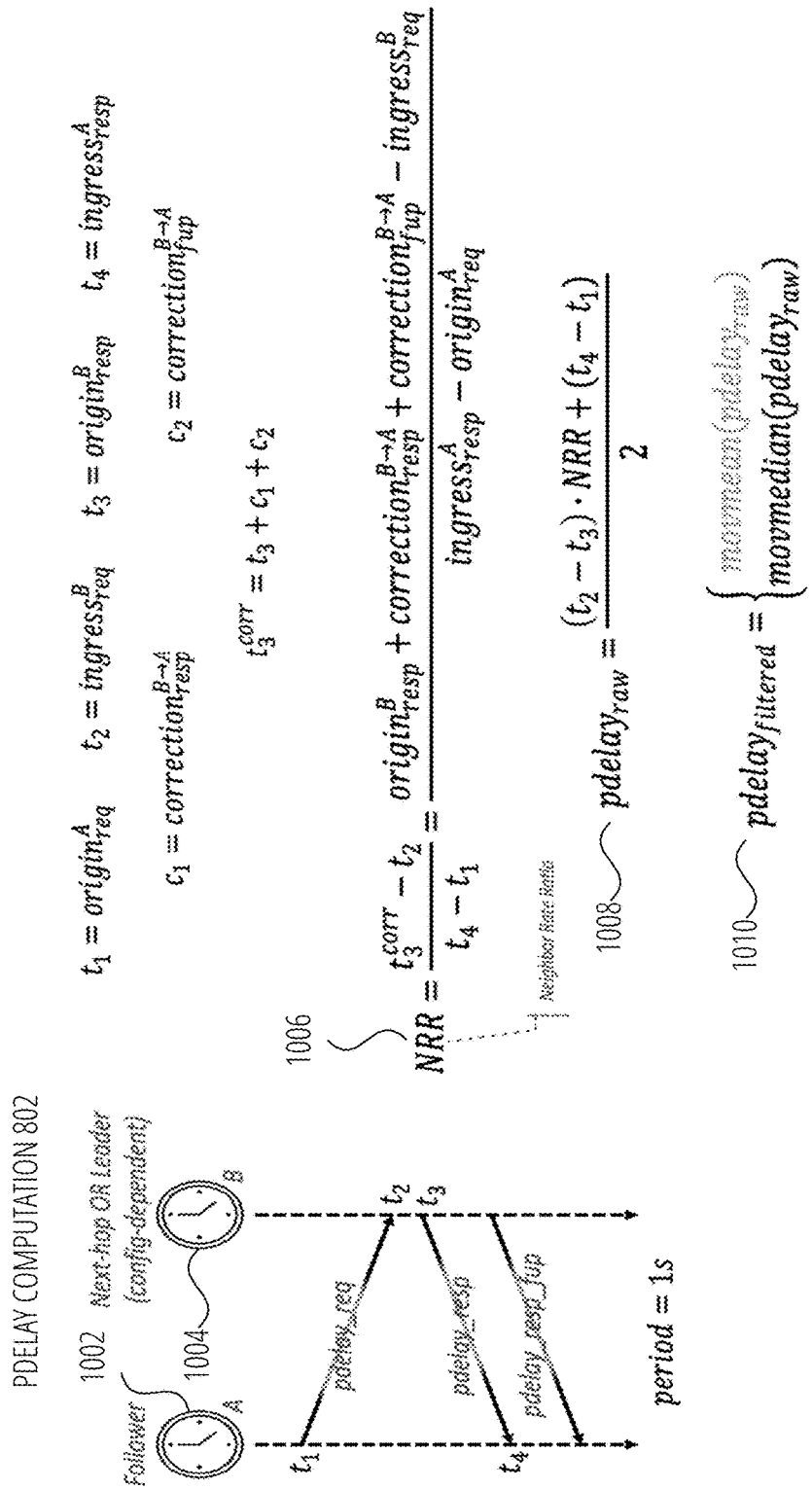
FIG. 10 illustrates an aspect of a packet delay (pdelay) computation 802.

FIG. 10 illustrates a message flow and a set of pdelay request/response related equations for a pdelay computation 802. FIG. 10 depicts a a CF node 1002 with a clock A and a CL node 1004 with a clock B. Alternatively, the clock B may be for a next hop from the CF node, such as a CF node that follows the CF node 1002 with clock A. At time t1, the CF node 1002 sends a pdelay request message (pdelay_request) to the CL node 1004. At time t2, the CL node 1004 receives the pdelay_request from the CF node 1002. At time T3, the CL node 1004 sends a pdelay response (pdelay_response) in response to the pdelay_request to the CF node 1002. At time t4, the CF node 1002 receives the pdelay_response from the CL node 1004. The CL node 1004 can also send a pdelay response follow-up message (pdelay_response_fup) after the pdelay_response to provide additional time information 418 to the CF node 1002. Note that a period for the time periods t1-t4 is set by default for is.

FIG. 10 also illustrates three equations that can be implemented by the pdelay computation 802. The pdelay computation 802 may implement a first equation 1006 to calculate a neighbor rate ratio between clocks A, B. The pdelay computation 802 may implement a second equation 1008 to calculate a raw pdelay value (e.g., filtering disabled). The pdelay computation 802 may implement a third equation 1010 to calculate a filtered pdelay value.

Figure 11:
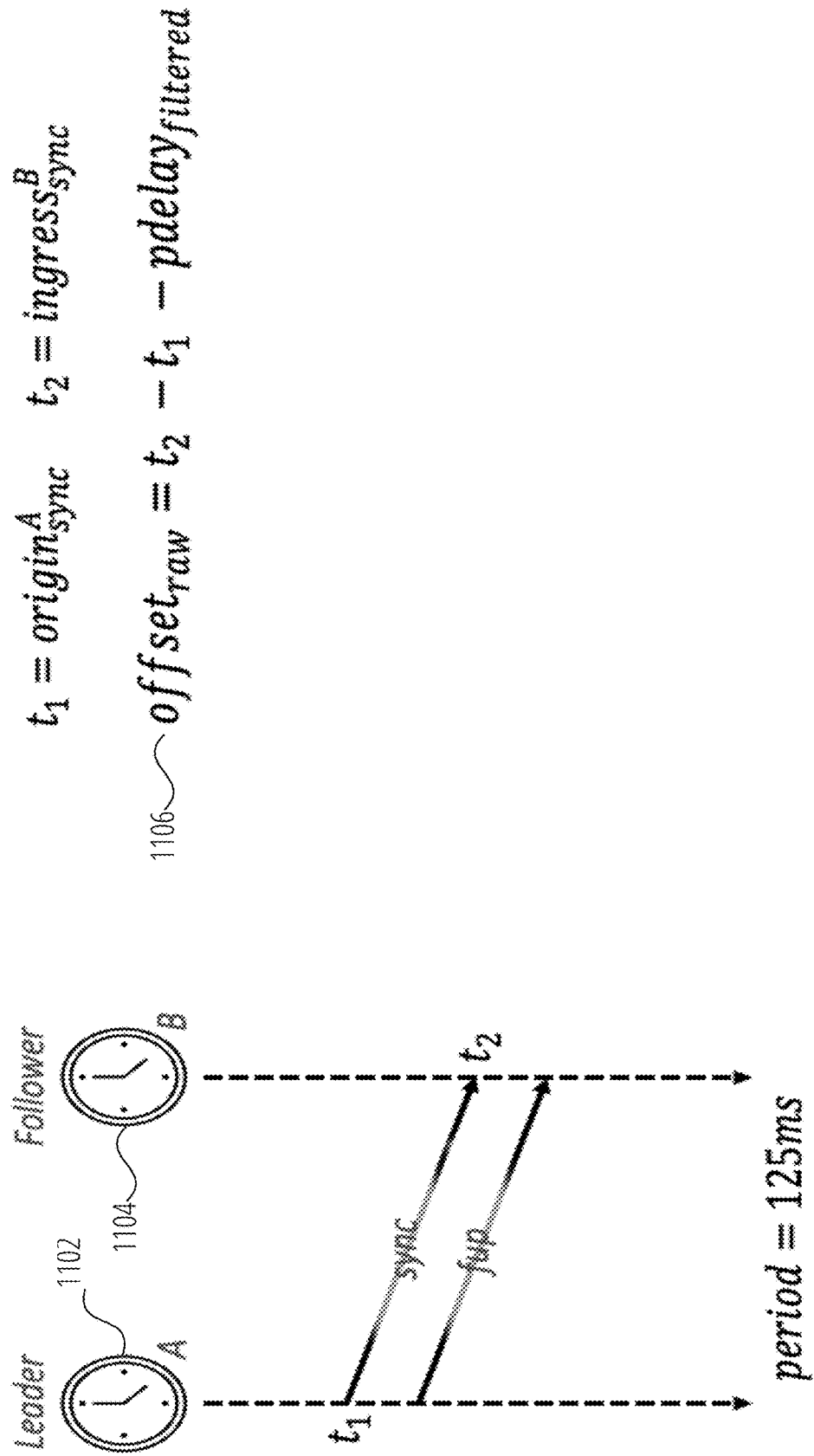
FIG. 11 illustrates an aspect of an offset computation 808.

FIG. 11 illustrates a message flow and set of sync/follow-up equations for an offset computation 808. FIG. 11 depicts a CL node 1102 and a CF node 1104. At time t1, the CL node 1102 sends a sync message to the CF node 1104. At time t2, the CF node 1104 receives the sync message (sync) from the CL node 1102. The CL node 1102 can also send a follow-up message (fup) to the CF node 1104. Note that a period for the time periods t1, t2 is set by default for 125 ms in PTP4L.

FIG. 11 also illustrates an equation 1106 that can be implemented by the offset computation 808. The equation 1106 can be used to calculate a raw offset value from the time information 418.

Formally, the model of the PI clock servo 812 can be specified in Equations (1) and (2) as follows:

$$x[k]=Ax[k-1]+Bo[k]$$

$$\widetilde{\Delta f}[k]=Cx[k]+Do[k], \quad \text{Equations (1) and (2)}$$

where x[k] is the internal state of the model (physically representing accumulation performed by the integral term of the PI controller), o[k] is the follower-to-leader offset, (Δf)⁻[k] is the predicted frequency adjustment output, and A, B, C, and D are model matrices. This also holds for a large class of linear, time-invariant regulators. Embodiments are not limited in the context of the specific clock servo. Different models may be used for clock servos different than the one implemented in PTP4L.

As mentioned earlier, offset measurements are filtered through a timestamp processor, before being fed to the clock servo, e.g., the timestamp processor acts as a prefilter. Therefore, it is important to consider the relationship between raw and filtered pdelay measurements, as the final analytical redundancy module should analytically compute the time offset, before it feeds it to the model of the clock servo. Consequently, modeling of the timestamp processor should be considered.

The timestamp processor, as implemented in PTP4L, is a finite window moving average filter. Therefore, it can be relatively straight forwardly replicated in the analytical redundancy module. However, more complex filtering can be employed in general. A large class of filters (including moving average) can be modeled using AutoRegressive with Exogenous input (ARX) models, where the output is formed as a linear combination of input and output regressors. The output of a sample ARX model is given by Equation (3) as follows:

$$y_{k+1} = \sum_{i=1}^{n_a} a_i y_{k-i+1} + \sum_{i=1}^{n_b} b_i u_{k-i+1}$$

Equation (3)

where y is the model output, a are coefficients of output regressors and b are coefficients of input regressors, while $n_a$ and $n_b$ are the size of the output and input regressor banks, respectively. In the case of the PTP4L timestamp processor, knowledge of the system is utilized to predefine regressor bank sizes to $n_a=0$ and $n_b=10$.

The clock manager model 704 depicted in FIGS. 8-11 was built and tested using models obtained with Matlab System Identification Toolbox (MSIT). Since the architecture of the clock manager 106 is known in the case of PTP4L, this software allows effective solution for model identification. The proportional-integral clock servo 506 is a linear regulator and its state can be captured with one dimension, that is the accumulator needed for the integral term of the proportional-integral control law. Consequently, a first order linear system should fit the dynamical behavior of the proportional-integral clock servo 506, and matrices A, B, C, and D of the model given Equations (1) and (2) can be obtained using system identification principles. Similarly, the parameters of the ARX model given in Equation (3) can be obtained for the moving-average timestamp processor. It is worthy to note that the data used to identify the model can contain steady-state behavior (e.g., once a CF node 1002 clock A has converged to a CL node 1004 clock B). It can also contain data characterizing dynamical response. Therefore, in experiments, a time series of offset and frequency adjustment measurements from TSN protocol boot time on a follower node are acquired until an offset has stabilized. This data can be used to first identify the clock manager model 704, and then validate and evaluate performance in various attack scenarios. FIGS. 12-19 shows sample experimental runs from which a suitable clock manager model 704 can be identified for a given clock manager 106.

Figure 12:
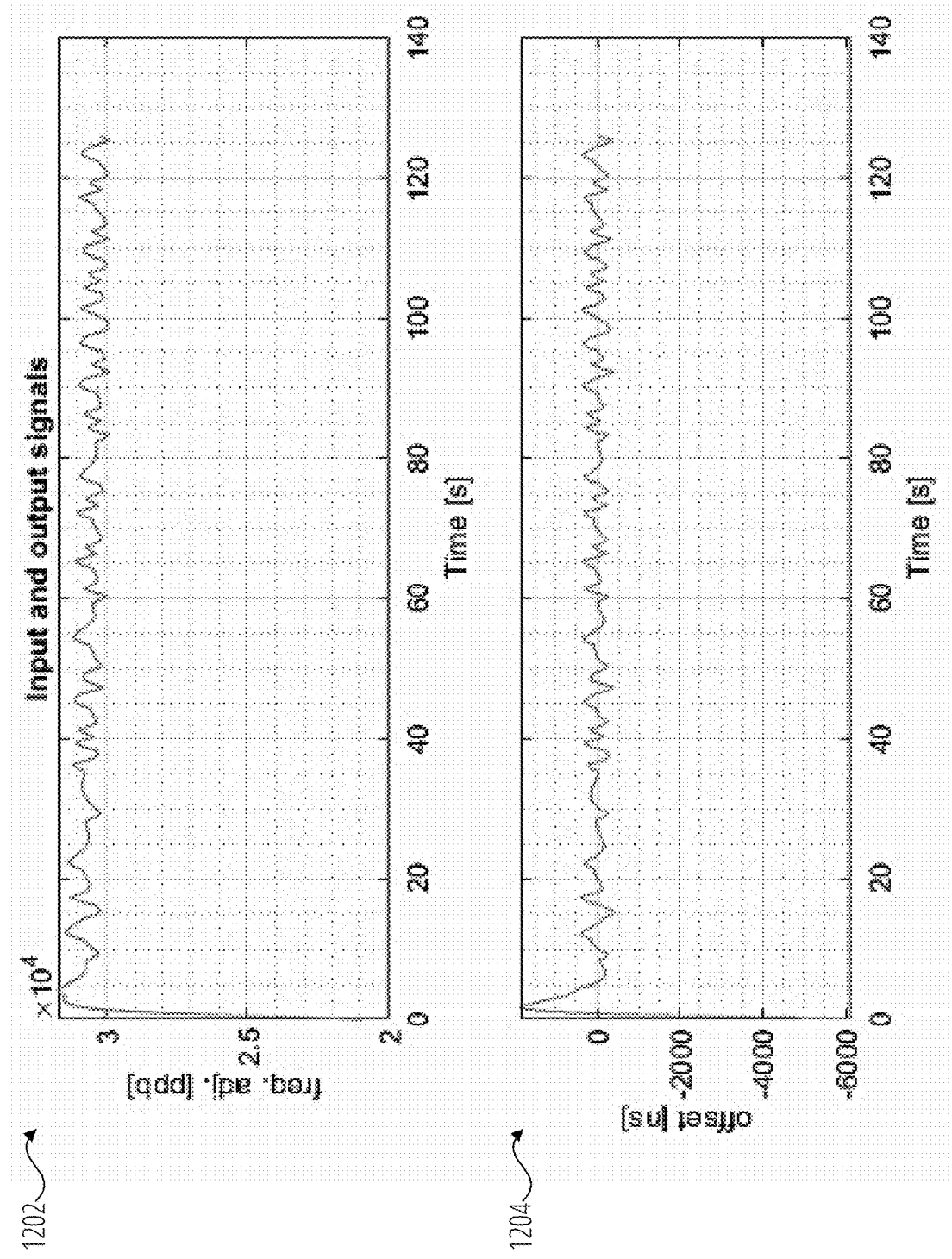
FIG. 12 illustrates aspects of a graph 1202 and a graph 1204.

FIG. 12 illustrates a set of graphs that represent input and output signals for a clock manager 106. FIG. 12 illustrates a sample benign run of a clock manager 106 implemented as a PTP4L on a CF node 1002 or CF node 1104 for 90 seconds. A first graph 1202 plots time in seconds for an x-axis, and frequency adjustments in parts-per-billion (ppb) for a y-axis. A second graph 1204 plots time in seconds for an x-axis, and an offset value for a y-axis. The graphs 1202, 1204 illustrate rapid stabilization of offset of the CF node 1002 clock A to the CL node 1004 clock B as shown in graph 1204 due to the clock manager 106 making frequency adjustments as shown in graph 1202.

Figure 13:
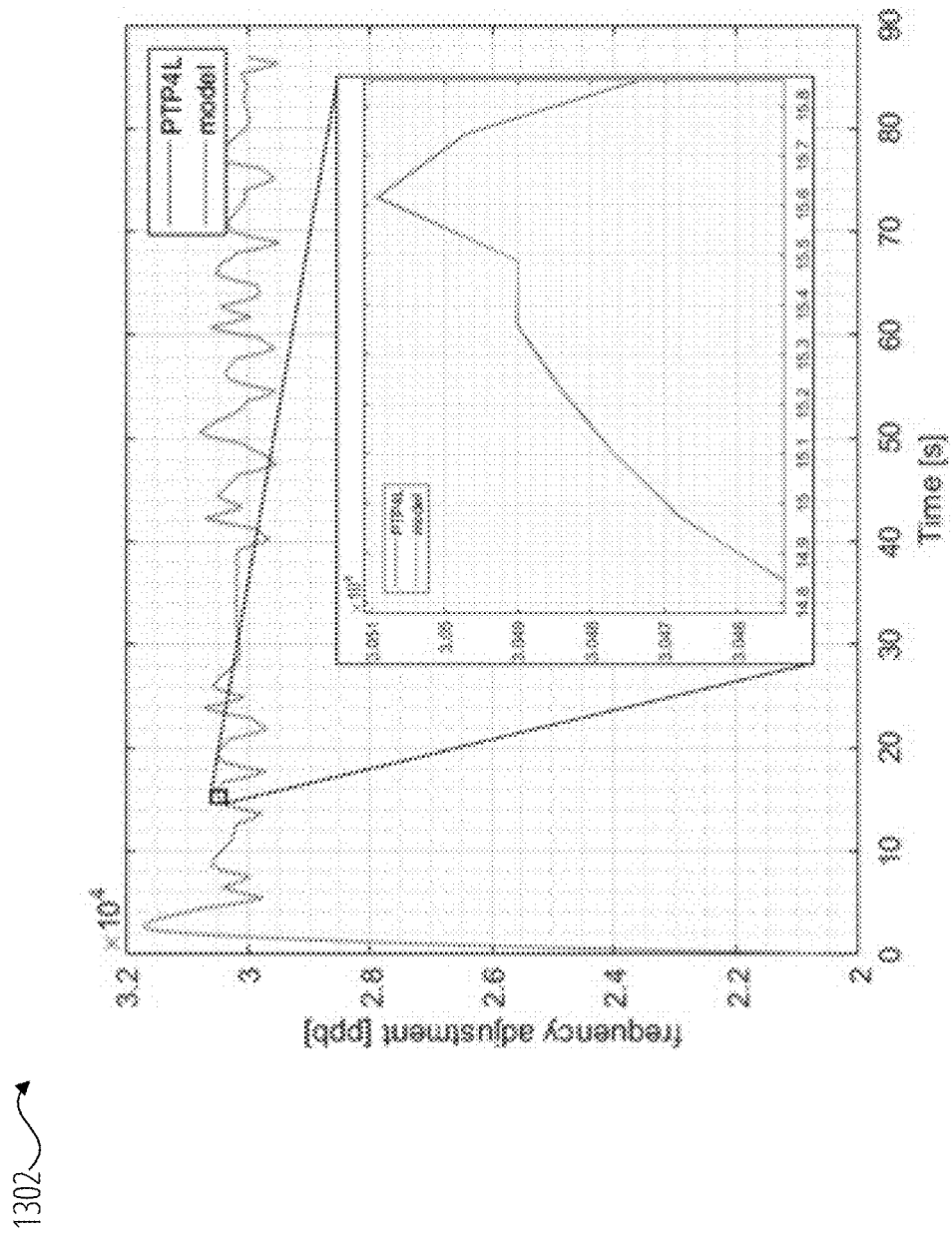
FIG. 13 illustrates an aspect of a graph 1302.

FIG. 13 illustrates a graph 1302 that represents measured and simulated model output. Similar to the graph 1202, the graph 1302 plots time in seconds for an x-axis, and frequency adjustments in ppb for a y-axis. If a model structure for the clock manager model 704 is defined as a first order-equivalent transfer function model (e.g., through frequency domain analysis), the MSIT successfully maps the model's zeros and poles to the dynamical behavior of the dataset with very high normalized root mean square error (NRMSE) of 99.97%, and typically above 95% for additional validation datasets. The simulated frequency adjustment is compared to the actual system for this case in the graph 1302. The graph 1302 illustrates measured and simulated PI clock servo output for a transfer function model using frequency-domain analysis. Note the responses are indistinguishably close.

Figure 14:
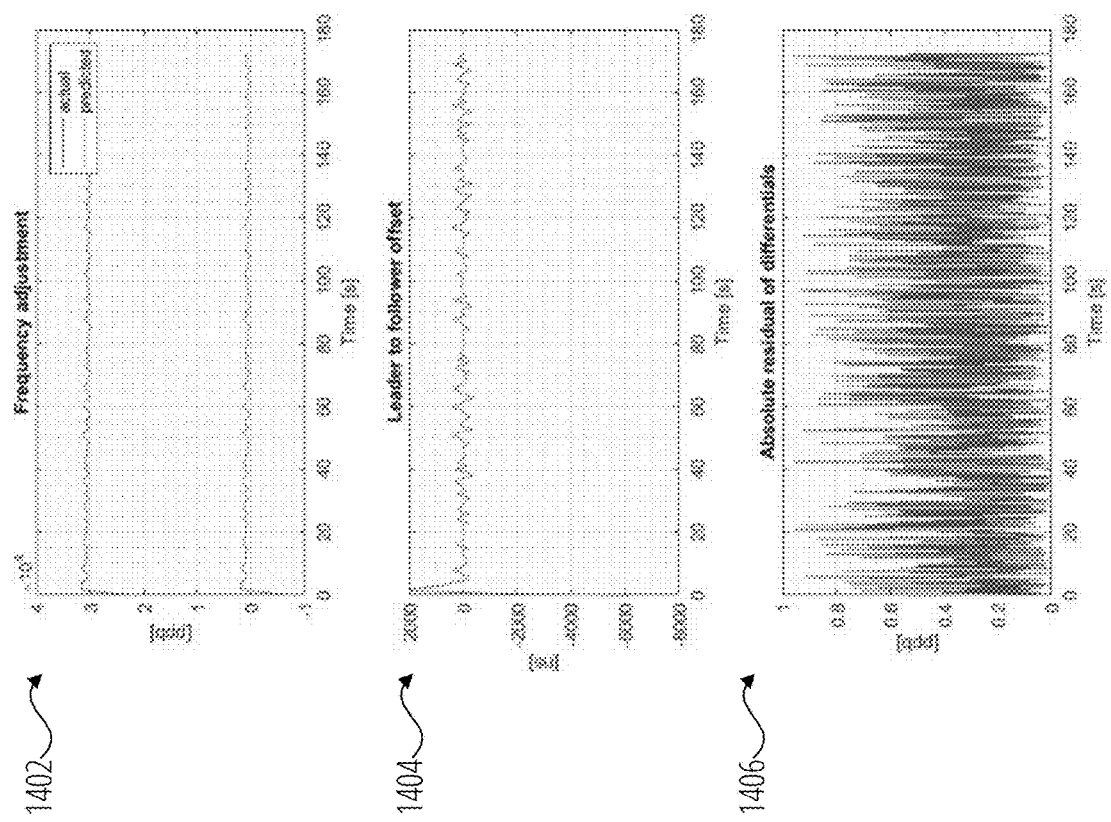
FIG. 14 illustrates aspects of graphs 1402, 1404 and 1406.

FIG. 14 illustrates a set of graphs that represent model output for a benign test run of the clock manager model 704. FIG. 14 depicts a set of graphs 1402, 1404 and 1406 representing adjustments by the detector 110 implementing the clock manager model 704. The graph 1402 illustrates frequency adjustments over time. The graph 1404 illustrates leader to follow offsets over time. The graph 1406 illustrate an absolute residual of differentials over time.

It is noted that a direct current (DC) offset between actual and predicted frequency adjustments shown in the graph 1402, once eliminated by differentiation (for example), allows subtracting those two signals and applying an absolute value to obtain the residual of output differentials shown in graph 1406 which are capped in a [0, 1] ppb interval. This indicates a very high level of model performance.

Since dynamical behavior can be tracked with a linear model, any offsets between the outputs of the actual system and the model-based predictions, can be addressed by DC offset elimination techniques. Since linear models capture the relationship between the change in input and the change in output, they do not describe differences between input and output levels (e.g., DC offset of the output). In other words, the predicted output of the above-mentioned models, as shown on an example execution in the graph 1402, is well below output of the actual system. However, for tracking dynamical behavior, such as a change in frequency adjustment over time, the DC offset of the frequency adjustment signal does not necessarily carry significant information.

In experiments, it was noticed that there exists no fixed offset between the simulated and actual frequency adjustments, suggesting a nonlinearity. The PTP4L clock servo itself is a time-invariant linear controller (e.g., PI servo code is not changing), and therefore it is unable to produce such non-constant input-to-output offsets. However, note that the PTP4L clock servo is consuming a measurement-based time offset measurement (e.g., CF node 1002 clock A to CL node 1004 clock B difference), which may be influenced by numerous (time-varying or nonlinear) artifacts, such as clock drift due to environmental conditions, uncertainty in timestamp capturing, and so forth. As such, a linear time-invariant (LTI) model does not necessarily capture the dynamics from offset to frequency adjustment as some time-varying effects propagate to the output (frequency adjustment) by entering the PTP4L clock servo through its input (time offset).

On the other hand, it is important to discern which information the low frequency offset holds. Since the model is executed as an analytical redundancy module, all relevant information is contained within a signal differential, e.g., the difference between consecutive samples. This reduces or essentially eliminates the need to measure, estimate, or predict the DC offset of the frequency adjustment signal which, depending on what signals from which it depends, is a vulnerable process from a security standpoint.

Therefore, as shown in FIG. 14, comparing consecutive samples of the frequency adjustment computed by PTP4L and the one computed by the clock manager model 704, an absolute residual (e.g., difference between actual and predicted output) is observed with a maximum value of 1. In other words, the clock manager model 704 is able to predict a sample-to-sample difference in output of a PTP4L clock servo of the clock manager 106 with an accuracy of approximately 1 ppb of frequency adjustment. Consequently, attacks targeting the signals relevant to the clock manager 106 can be flagged with very high accuracy.

Figure 15:
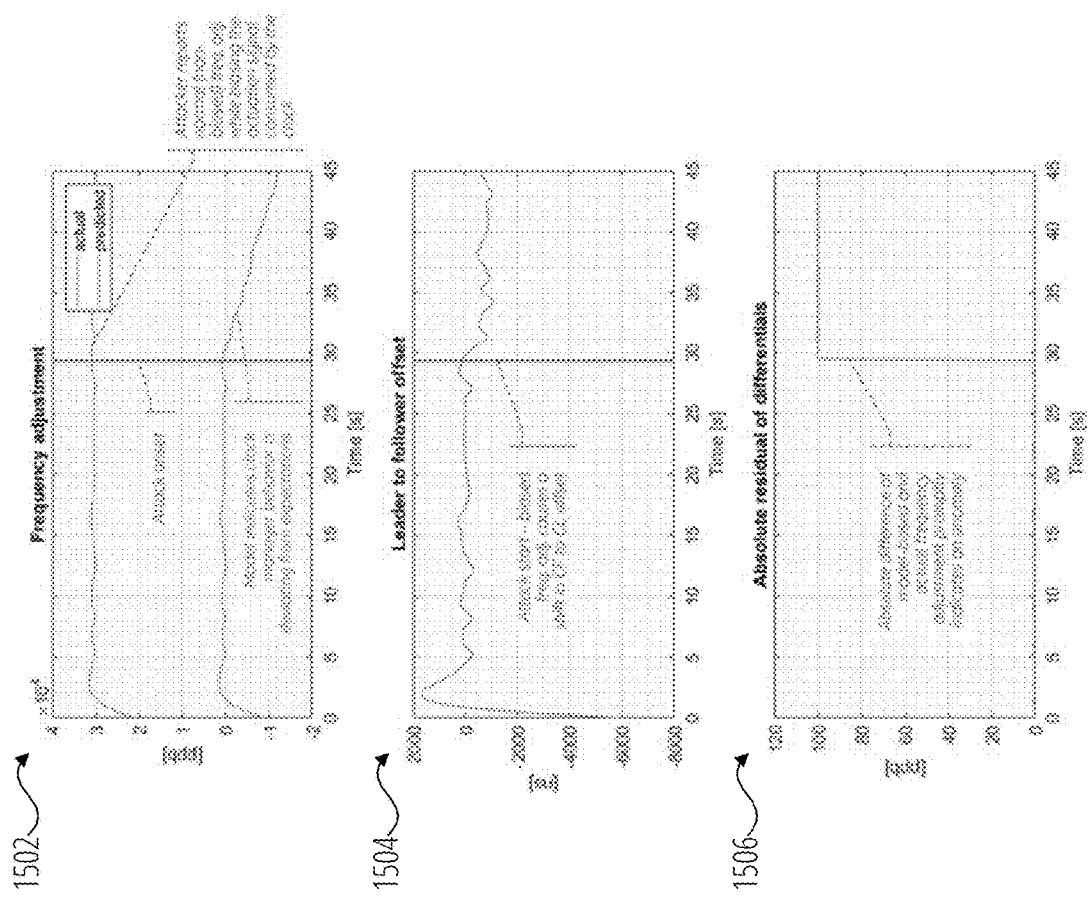
FIG. 15 illustrates aspects of graphs 1502, 1504 and 1506.

FIG. 15 illustrates a set of graphs that represent model output for an attack test run of the clock manager model 704. FIG. 15 depicts a set of graphs 1502, 1504 and 1506 representing measured adjustments by the clock manager 106. The graph 1502 illustrates frequency adjustments over time. The graph 1504 illustrates leader to follow offsets over time. The graphs 1506 illustrates an absolute residual of differentials over time.

The attack test run simulates an attack with a linear bias ramp of 100 ppb per sync period on the frequency adjustment signal. The graphs 1502, 1504 and 1506 show an attack starting at 30 seconds. The graph 1506 shows that a residual signal is centered exactly around 100 ppb for an attack that biases the frequency adjustment signal by 100 ppb every sync cycle, both in the case of an attack onset during steady state, and from a protocol boot time. The graph 1504 shows that the attack gains effect in skewing a time for the CF node 1002 in the leader to follower offset plots. In other words, the offset is no longer centered around 0 nanoseconds (ns).

As previously discussed, the clock manager model 704 obtained from system identification can be specified in Equations (1) and (2), where x[k] is the internal state of the model (physically representing accumulation performed by the integral term of the PI controller), o[k] is the follower-to-leader offset, $(\Delta f)\tilde{\ }[k]$ is the predicted frequency adjustment output, and A, B, C, and D are model matrices. In the particular case discussed above, for the preset PI controller tuning parameters, the identified model matrices are: A=1.0000, B=1.0000, C=0.1306, and D=1.4368.

As previously discussed, a large class of filters (including moving average) can be modeled using ARX models, where the output is formed as a linear combination of input and output regressors. The output of a sample ARX model is given by Equation (3), where y is the model output, a are coefficients of output regressors and b are coefficients of input regressors, while $n_a$ and $n_b$ are the size of the output and input regressor banks, respectively. In the case of the PTP4L timestamp processor, knowledge of the system is utilized to predefine regressor bank sizes to $n_a$=0 and $n_b$=10. While a moving average can be modeled by setting $a_i$=0.1, $\forall i$, system identification can still be performed without this assumption, to reinforce validity of the modeling approach.

Figure 16:
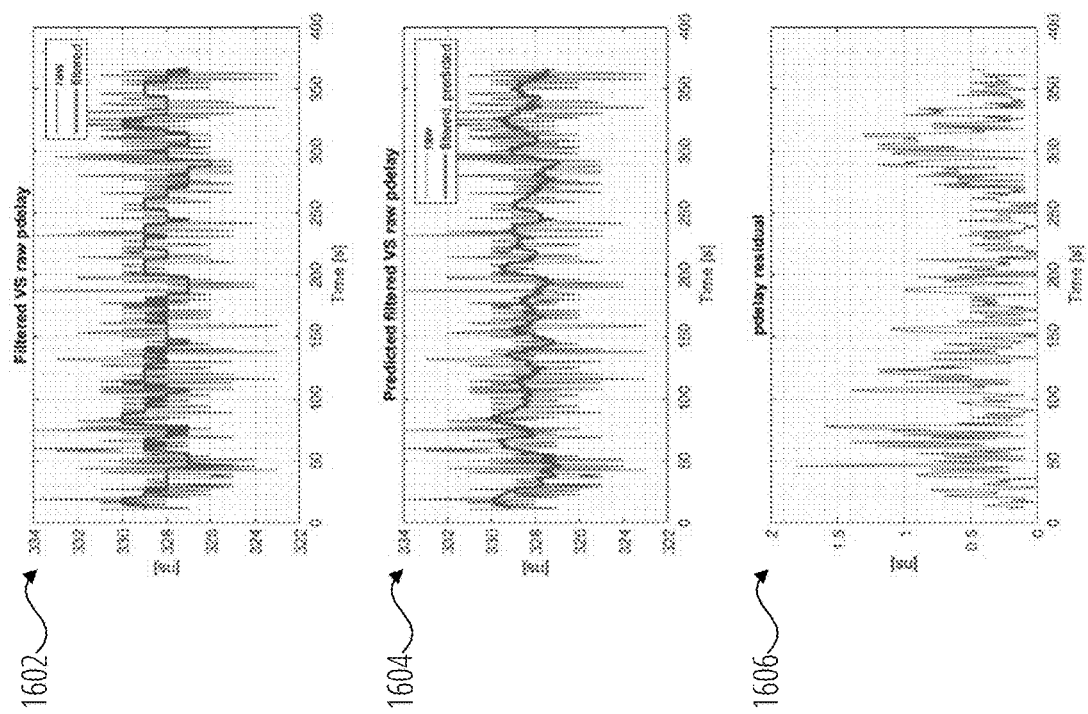
FIG. 16 illustrates aspects of graphs 1602, 1604 and 1606.

FIG. 16 illustrates a set of graphs that show results of PTP4L timestamp processor model validation on a benign test run. FIG. 16 depicts a set of graphs 1602, 1604 and 1606 representing results of a first test run of the timestamp processor model. The graph 1602 illustrates PTP4L filtered versus raw pdelay over time. The graph 1604 illustrate ARX model predicted filtered versus raw pdelay over time. The graph 1606 illustrates a model-to-system pdelay deviation or pdelay residual over time.

More particularly, FIG. 16 illustrates an ARX model validation on two benign runs. The graph 1602 shows how the PTP4L timestamp processor efficiently filters noisy pdelay measurements. The graph 1604 shows the same for the obtained ARX model. The graph 1606 shows an absolute difference in timestamp processor and ARX model outputs illustrating a deviation between these two. Residual value of under 2 nanoseconds (ns) illustrates excellent model performance in terms of usability for filtering pdelay measurements before feeding into the clock servo model. Note that the ARX model here is not giving a prediction during the first 10 s when the regressor bank is partially full (this segment is omitted in FIG. 16). This particular feature can be overcome by forcing the ARX model to provide moving-average output on less than 10 samples, initially, even before 10 consecutive samples become available. As previously discussed, averaging of 10 samples is taken as an example configuration of PTP4L. Embodiments are not limited in the context of the specific timestamp processor tuning.

Figure 17:
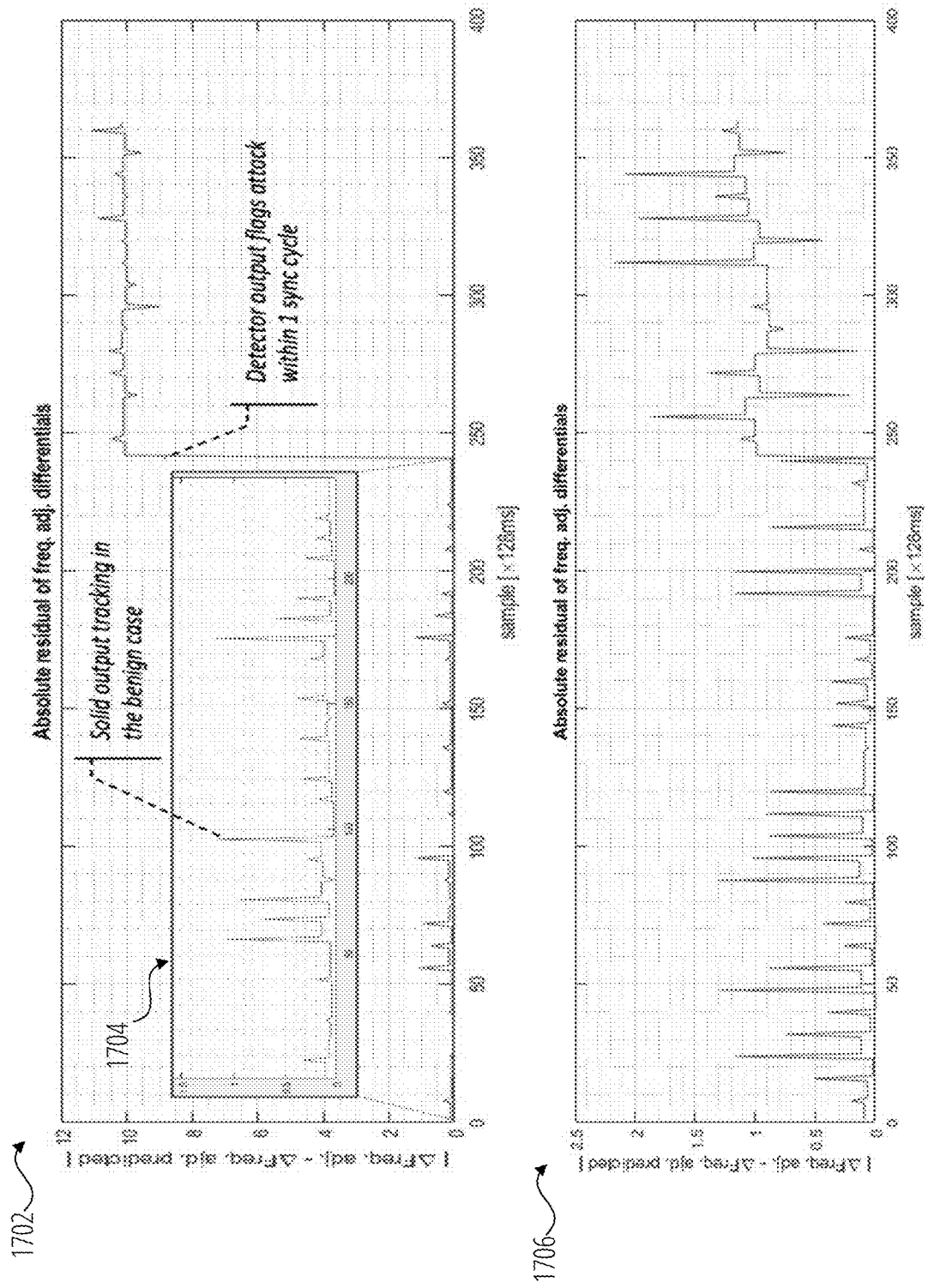
FIG. 17 illustrates aspects of graphs 1702, 1704 and 1706.

FIG. 17 illustrates a set of graphs 1702, 1704 and 1706 showing relevant signals from a prototype implementation running alongside a PTP4L actuation attack, under an attack scenario shown in FIG. 5D (attack vector 512c). The graph 1702 shows an absolute residual of frequency adjustment differentials for a particular attack that is biasing the frequency adjustment signal by additional 10 ppb per sync cycle when executing a prototype implementation of the detector 110 and the clock manager model 704. The sync cycle is 125 ms. The graph 1704 is an expanded view of a portion of the graph 1702 between sample times 0 to 240. The graph 1706 shows an absolute residual of frequency adjusted differentials for a similar attack of lesser amplitude, i.e., 1 ppb per sync cycle of frequency adjustment bias when executing a prototype implementation of the detector 110 and the clock model 704. Experiments are executed on a TSN experimental testbed as a C language-based analytical model running alongside PTP4L.

The graphs 1702, 1704 illustrate performance of the detector 110 when an attacker initiates an actuation attack with a relatively large frequency adjustment deviation of 10 ppb. As shown in the graphs 1702, 1704, the clock manager model 704 provides relatively close output tracking during benign operations. Over sample times 0 to 240, the values for the differentials are less than 1 ppb (DC value centered around 0). During sample 240, however, the DC value is shifted by 10 ppb during a single sync cycle (125 ms). The detector 110 may have thresholds set to detect a residual signal deviation equal to or greater than 10 ppb, thereby indicating initiation of a potential attack. In this case, the detector 110 can generate an alert indicating the attack is initiated within 1 sync cycle (128 ms).

The graph 1706 illustrates performance of the detector 110 when an attacker initiates an actuation attack with a relatively small frequency adjustment deviation of 1 ppb. Similar to the graphs 1702, 1704, the graph 1706 shows that the clock manager model 704 provides relatively close output tracking during benign operations. Over sample times 0 to 240, the DC values for the differentials are centered around 0, and typically under 1 ppb. During sample 240, however, the DC values are shifted by 1 ppb during a single sync cycle (128 ms). This may be an indicator that an attacker is initiating an attack of 1 ppb per sync cycle, with an intent to ramp time deviations over many sync cycles to escape detection. However, the graph 1706 shows that the clock manager model 704 is sensitive enough to detect even such small deviations. As such, the detector 110 may have a first threshold set to detect a time deviation equal to or greater than 1 ppb, thereby indicating initiation of a potential attack, which merits further monitoring. Additional thresholds can be set to detect accumulated deviations. In this case, the detector 110 can generate an alert indicating the attack is initiated over multiple sync cycles.

Figure 18:
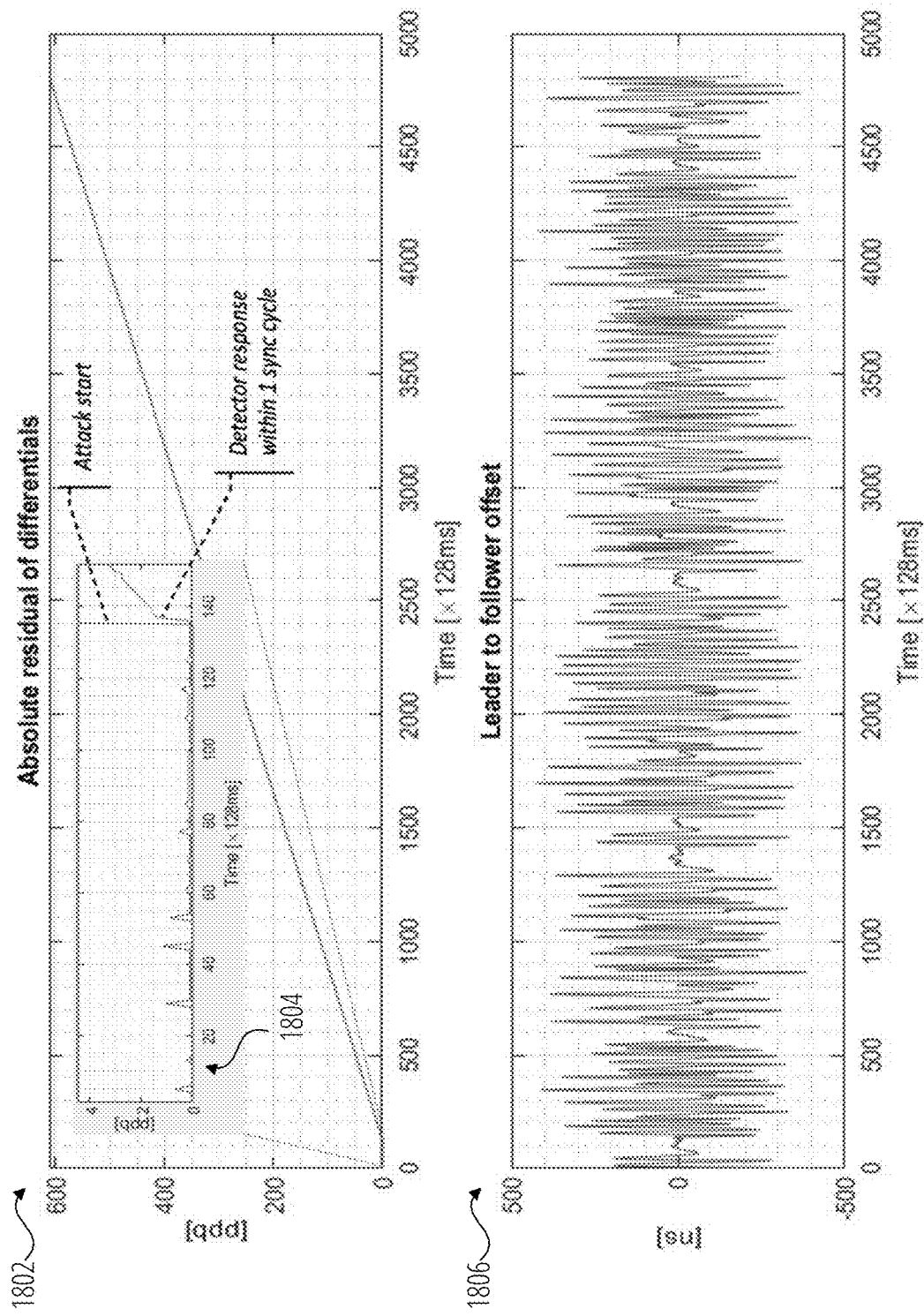
FIG. 18 illustrates aspects of graphs 1802, 1804 and 1806.

FIG. 18 illustrates a set of graphs 1802, 1804 and 1806 showing a prototype implementation running alongside a PTP4L sensing attack, under an attack scenario shown in FIG. 5B (attack vector 512*a*). The graph 1802 shows an absolute residual of frequency adjustment differentials for an attack introducing CF to CL time offset bias of 1 ns per sync cycle when executing a prototype implementation of the detector 110 and the clock manager model 704. The sync cycle is 128 ms. The graph 1804 is an expanded view of a portion of the graph 1802 between times 0 to 135 (×128 ms). The graph 1806 shows a leader to follower offset when executing a prototype implementation of the detector 110 and the clock manager model 704. Experiments are executed on a TSN experimental testbed as a C language-based analytical model running alongside PTP4L.

The graphs 1802, 1804 illustrate performance of the detector 110 when an attacker initiates a sensing attack with a relatively small time deviation of 1 ns. As shown in the graphs 1802, 1804, the clock manager model 704 provides relatively close output tracking during benign operations. Over times 0 to 135, the DC values for the differentials are less than 1 ppb. During time 135 and thereafter, however, the absolute residual of differentials is rapidly increasing. The detector 110 may have thresholds set to detect a time deviation equal to or greater than 1 ppb, thereby indicating initiation of a potential attack. In this case, the detector 110 can generate an alert indicating the attack is initiated within 1 sync cycle (128 ms).

The graph 1806 illustrates an effect that such an attack has on the CF to CL offset. While the effect of the sensing attack is virtually imperceivable, the detector 110 is sensitive enough to detect attacks using relatively small time offset bias.

During implementation of the detector 110 and the clock manager model 704, it is assumed that the inputs to the detector 110 are not influenced by the attacker. This means that the detector 110 answers a question of "Given the timing measurements (i.e., sensing), is the frequency adjustment (i.e., actuation) provided by the clock manager as expected?" Therefore, various possible execution environments are possible for the detector 110. For instance, one implementation is within the hardware platform 408 of a TSN node 104, such as the transceiver 410, where the algorithm and relevant signals are away from an attacker's influence. Another implementation is an edge-based detector that receives relevant signals from the clock manager 106 and executes the clock manager model 704. The edge-based detector can be implemented as part of an intrusion detection system 714 for a TSN node 104. Additionally or alternatively, the edge-based detector can be implemented by a separate device communicatively coupled to the TSN node 104. Yet another implementation is within the software platform 402 of a TSN node 104, such as a protected software module under a hypervisor-based system like virtual machines or a Trusted Execution Environment such as an Intel Software Guard Extension (SGX) and an Intel Trust Domain Extensions (TDX), under the condition that ring 0 components are outside of an attacker's reach. Other implementations are possible, and embodiments are not limited in this context.

It is worthy to note that some embodiments describe a "grey-box" approach for the clock manager model 704. The grey-box approach analyzes an architecture of a particular clock manager 106 to produce a basis for further modeling. Additionally or alternatively, some embodiments may implement a "black-box" approach. The black-box approach is where clock manager inputs and outputs can be used in a system identification algorithm to obtain a clock manager model 704 without previously analyzing an architecture of a clock manager 106 and control algorithms therein.

Figure 19:
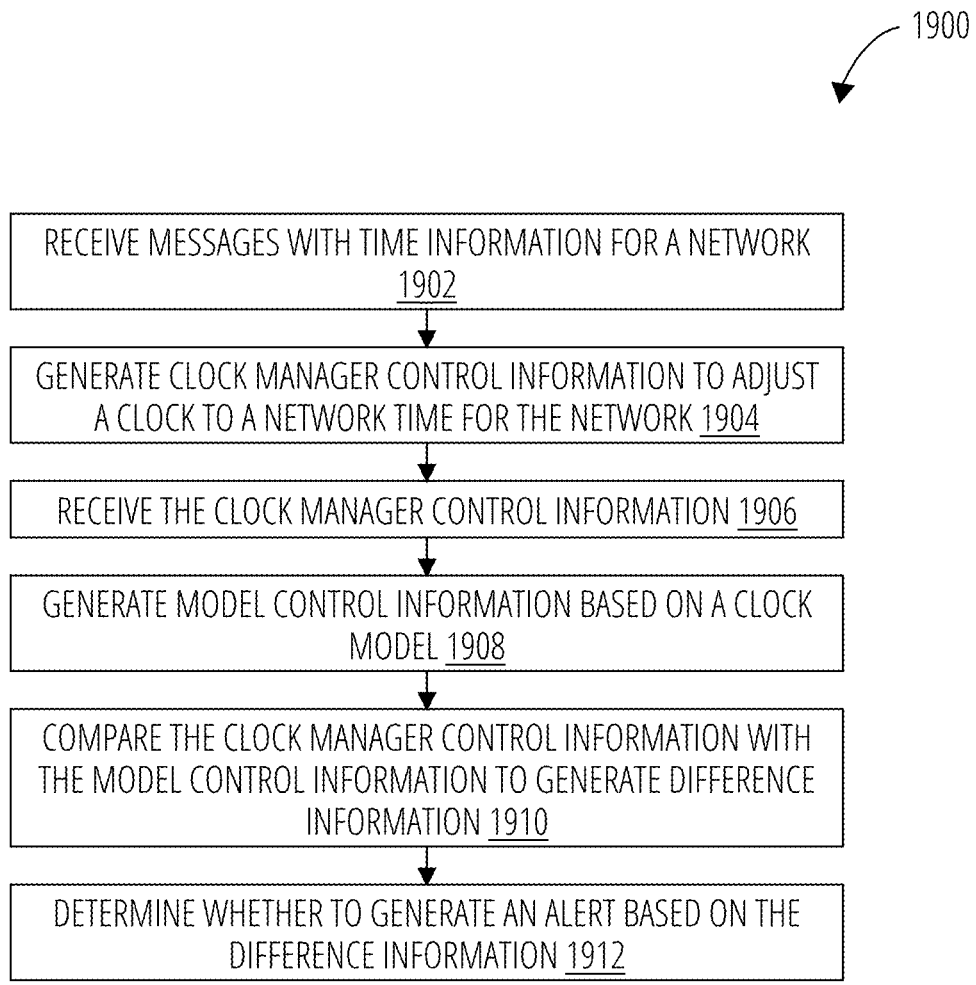
FIG. 19 illustrates a logic flow 1900 in accordance with one embodiment.

FIG. 19 illustrates a logic flow 1900. The logic flow 1900 can be implemented by a TSN node 104. For instance, the logic flow 1900 can be implemented by an apparatus 400, 500, 600 or 900 for a TSN node 104.

In block 1902, logic flow 1900 receives messages with time information for a network. For instance, a TSN 104 can implement an apparatus 600. A transceiver 410 of the apparatus 600 receives messages 112 with time information 418 for a time sensitive network 102. The transceiver 410 sends the time information 418 to a clock manager 106.

In block 1904, logic flow 1900 generates clock manager control information to adjust a clock to a network time for the network. For instance, the clock manager 106 generates clock manager control information 420 to adjust a clock implemented by clock circuitry 412 to a network time for the time sensitive network 102.

In block 1906, logic flow 1900 receives the clock manager control information. For instance, a detector 110 of the apparatus 600 receives or intercepts the clock manager control information 420 from the clock manager 106.

In block 1908, logic flow 1900 generates model control information based on a clock model. For instance, a clock manager estimator 702 of the detector 110 receives the time information 418 as input. The clock estimator 702 generates model control information 706 based on a clock manager model 704. The clock manager model 704 is an analytical, physics-aware, implementation of the clock manager 106 that is separate from, and completely independent of, the clock manager 106. The clock manager model 704 captures dynamical clock manager behavior that holds state. It is a lightweight software implementation that executes in parallel with the clock manager 106. The clock manager model 704 is an analytical model that implements algebraic equations to increase compute and memory efficiency of an apparatus, device or system.

In block 1910, logic flow 1900 compares the clock manager control information with the model control information to generate difference information. For instance, a comparator 708 of the detector 110 receives as input the model control information 706 from the clock manager estimator 702 and clock manager control information 420 from the clock manager 106. The comparator 708 compares the clock manager control information 420 and the model control information 706, and generates difference information 710. The difference information 710 is a differential or residual between the clock manager control information 420 and the model control information 706, typically expressed in parts per billion (ppb).

In block 1912, logic flow 1900 determines whether to generate an alert based on the difference information. For instance, an alert generator 712 of the detector 110 receives the difference information 710 from the comparator 708.

The alert generator 712 compares the difference information 710 to one or more threshold values. The alert generator 712 determines whether to generate an alert based on results of the comparison of the difference information 710 with the one or more threshold values. For instance, a threshold value might be expressed as m ppb, where m is any positive integer, such as 1 ppb, 5 ppb, 10 ppb, and so forth. When the difference information 710 is greater than, equal to, or lower than a threshold value (depending on implementation), the alert generator 712 sends an alert to an intrusion detection system 714. The intrusion detection system 714 receives the alert and implements one or more security protocols in response to the alert, such as isolating the TSN node 104, sending notifications to neighboring TSN nodes 104, reconfiguring a network topology for a time sensitive network 102 implementing the TSN node 104, informing a human operator, and so forth.

Figure 20B:
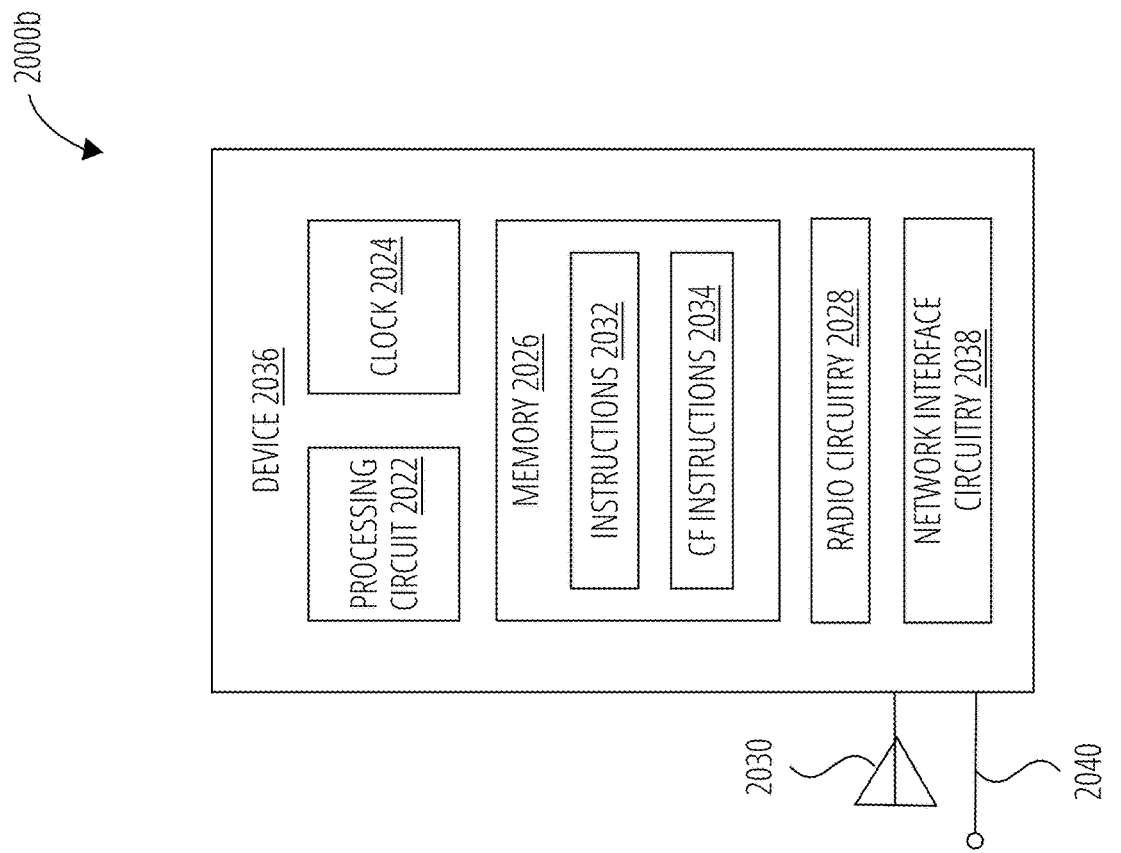
FIG. 20B illustrates an aspect of a clock follower (CF) 2000b.
Figure 20A:
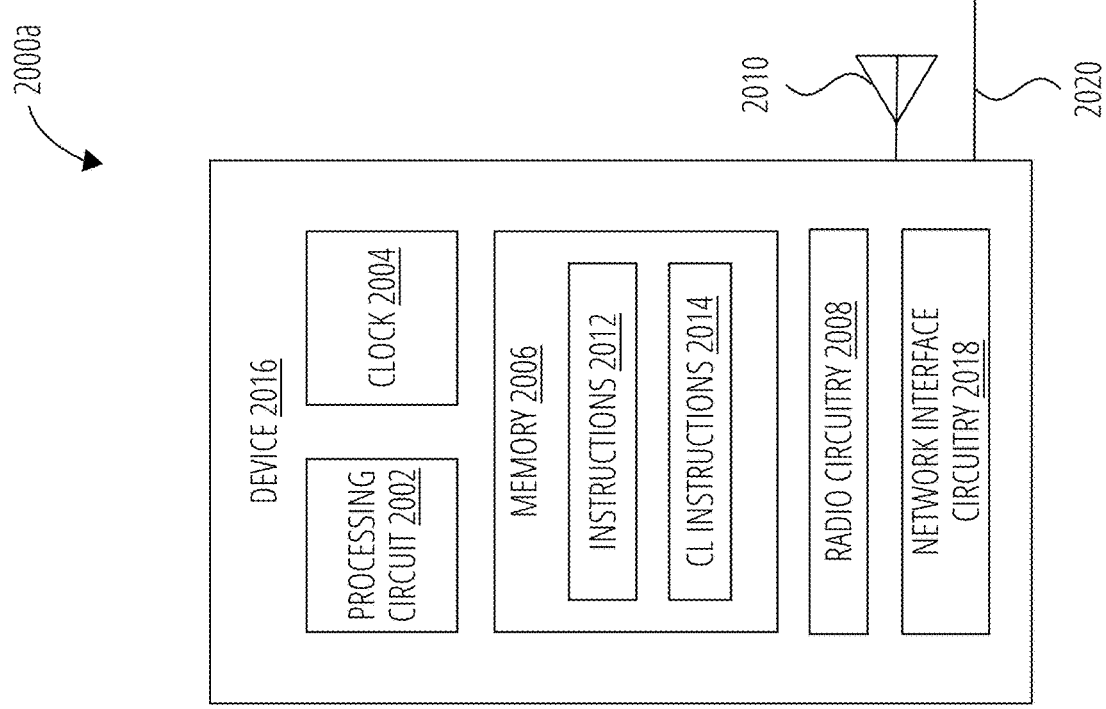

FIG. 20A depicts a device 2016. The device 2016 could be a network node or one of the switches in a TSN network (e.g., TSN nodes 104, talker node 202, relay nodes 204a-c, listener node 206, relay node 302, CF node 1002, CL node 1004, CF node 1104, CL node 1102, etc.). Device 2016 includes a processing circuit 2002, a clock 2004, memory 2006, radio circuitry 2008, an antenna 2010, a network interface circuitry 2018, and a wired connection 2020. Memory 2006 stores instructions 2012 and CL instructions 2014. During operation, processing circuit 2002 can execute instructions 2012 and/or CL instructions 2014 to cause device 2016 to send timing messages as a clock leader or grand clock leader (e.g., from time measurements from a global clock for a TSN network) to other devices in the TSN network. In some examples, processing circuit 2002 can execute instructions 2012 and/or CL instructions 2014 to cause device 2016 to send time synchronization messages, time update messages, and other timing messages defined by various IEEE standards as discussed herein. Furthermore, processing circuit 2002 can execute instructions 2012 to cause device 2016 to send, via radio circuitry 2008 and antenna 2010 or network interface circuitry 2018 timing messages as the CL for a CF in a TSN network.

FIG. 20B depicts a device 2036. The device 2036 could be one of the network nodes or switches in a TSN network (e.g., TSN nodes 104, talker node 202, relay nodes 204a-c, listener node 206, relay node 302, CF node 1002, CL node 1004, CF node 1104, CL node 1102, etc.). Device 2036 includes a processing circuit 2022, a clock 2024, memory 2026, radio circuitry 2028, an antenna 2030, a network interface circuitry 2038, and a wired connection 2040. Memory 2026 stores instructions 2032 and CF instructions 2034. During operation, processing circuit 2022 can execute instructions 2032 and/or CF instructions 2034 to cause device 2036 to receive timing messages as a clock follower (e.g., from time measurements from a global clock for a TSN network) from other devices in the TSN network, such as the device 2016. In some examples, processing circuit 2022 can execute instructions 2032 and/or CF instructions 2034 to cause device 2036 to receive time synchronization messages, time update messages, and other timing messages defined by various IEEE standards as discussed herein. Furthermore, processing circuit 2022 can execute instructions 2032 and/or CF instructions 2034 to cause device 2036 to receive, via radio circuitry 2028 and antenna 2030 or network interface circuitry 2038 timing messages as the CF for a CL in a TSN network. In addition, processing circuit 2022 can execute instructions 2032 and/or CF instructions 2034 to cause device 2036 to send, via radio circuitry 2028 and antenna 2030 or network interface circuitry 2038 security messages in response to a security attack, such as alert messages, notification messages, network reconfiguration messages, device isolation messages, model update messages, and other messages in a TSN network.

Figure 21:
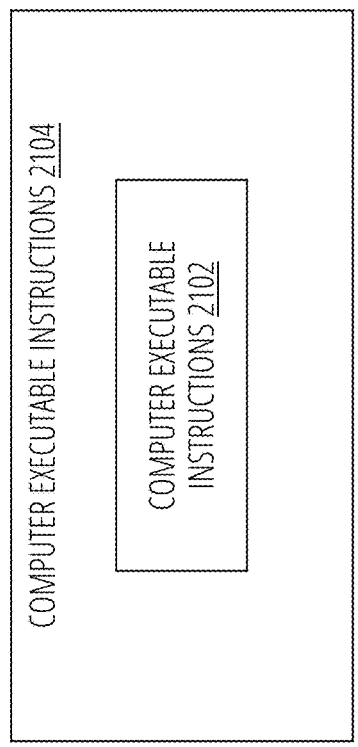
FIG. 21 illustrates an aspect of a computer-readable medium 2100.

FIG. 21 illustrates computer-readable storage computer-readable medium 2100. Computer-readable storage computer-readable medium 2100 may comprise any non-transitory computer-readable storage medium or machine-readable storage medium, such as an optical, magnetic or semiconductor storage medium. In various embodiments, computer-readable storage computer-readable medium 2100 may comprise an article of manufacture. In some embodiments, computer-readable storage computer-readable medium 2100 may store computer executable instructions 1402 (deleted) with which circuitry (e.g., processing circuitry 414, processing circuit 2002, processing circuit 2022, radio circuitry 2008, radio circuitry 2028, network interface circuitry 2018, network interface circuitry 2038, clock manager 106, clock circuitry 412, or the like) can execute. For example, computer executable instructions 2102 can include instructions to implement operations described with respect to logic flows 1900 and 2000. Examples of computer-readable storage computer-readable medium 2100 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 2102 may include any suitable type of code, such as source code, compiled code, interpreted code, executable code, static code, dynamic code, object-oriented code, visual code, and the like.

The following aspects and examples pertain to further embodiments, from which numerous permutations and configurations will be apparent.

In one aspect, an apparatus, includes a clock circuitry to manage a clock for a device, a processing circuitry coupled to the clock circuitry, the processing circuitry to execute instructions to perform operations for a clock manager, the clock manager to receive messages with time information for a network and generate clock manager control information to adjust the clock to a network time for the network, and a detector coupled to the processing circuitry and the clock circuitry, the detector to receive the clock manager control information, generate model control information based on a clock model, compare the clock manager control information with the model control information to generate difference information, and determine whether to generate an alert based on the difference information.

The apparatus may also include where the network is a time sensitive network.

The apparatus may also include where the device operates in accordance with an Institute of Electrical and Electronics Engineers (IEEE) 802.1AS and/or 802.1Qbv and/or 802.15.4 standards.

The apparatus may also include where the network time is a precision time protocol (PTP) time.

The apparatus may also include where the messages are synchronization messages or follow up messages for a precision time protocol (PTP).

The apparatus may also include where the clock managed by the clock circuitry is a precision time protocol (PTP) hardware clock (PHC).

The apparatus may also include where the device operates in a clock follower (CF) role.

The apparatus may also include where the clock manager is a precision time protocol (PTP) for Linux (PTP4L)

software component configured to account for a time offset between a clock of a clock leader (CL) in a PTP-synchronized network and the clock for the device when operating as a clock follower (CF) in the PTP-synchronized network.

The apparatus may also include where the clock manager control information to comprise a time offset between a reference time and a time maintained by the clock, the reference time based on the time information in at least one message.

The apparatus may also include where the clock manager control information to comprise one or more parameters to adjust the clock circuitry for the device, the one or more parameters to represent adjustments to a phase or frequency of the clock circuitry.

The apparatus may also include the detector to generate model control information based on a clock model, the clock model to comprise a physics-based analytical model to represent physical relationships between components of a system.

The apparatus may also include the detector to generate model control information based on a clock model, where the clock model is an equation-based representation of a proportional-integral (PI) controller.

The apparatus may also include the detector to determine whether to generate an alert based on the difference information, the detector to compare the difference information measured periodically to a defined threshold representing a value in parts per billion (ppb).

The apparatus may also include the detector to determine whether to generate an alert based on the difference information, the detector to compare the difference information measured every synchronization cycle to a defined threshold represented in units of parts per billion (ppb), the defined threshold to be equal to or greater than 1 ppb.

The apparatus may also include where the network is a controller area network (CAN) or a vehicle area network (VAN).

The apparatus may also include where the device manages a sensor, actuator or a controller.

The apparatus may also include where the sensors comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, and an acoustic sensor.

The apparatus may also include includes an intrusion detection system (IDS) coupled to the detector, the IDS system to receive the alert and take corrective action for the device or the network.

The apparatus may also include includes a memory coupled to the processing circuitry, the memory to store instructions that when executed by the processing circuitry performs operations for the clock manager.

The apparatus may also include includes a memory coupled to the processing circuitry, the memory to store instructions that when executed by the processing circuitry performs operations for the detector.

The apparatus may also include where the detector includes circuitry for a hardware platform.

The apparatus may also include where a single integrated device includes a processing circuitry, a memory, a transceiver, the clock circuitry, the clock manager, and the detector.

The apparatus may also include includes a transceiver coupled to the processing circuitry, the transceiver to communicate the messages with the time information for the device. Other technical features may be readily apparent to one skilled in the art from the following figures, descriptions, and claims.

In one aspect, a computing-implemented method, includes receiving messages with time information for a network, generating clock manager control information to adjust a clock to a network time for the network, receiving the clock manager control information, generating model control information based on a clock model, comparing the clock manager control information with the model control information to generate difference information, and determining whether to generate an alert based on the difference information.

The computing-implemented method may also include where the network is a time sensitive network.

The computing-implemented method may also include where the network operates in accordance with an Institute of Electrical and Electronics Engineers (IEEE) 802.1AS and/or 802.1Qbv and/or 802.15.4 standards.

The computing-implemented method may also include where the network time is a precision time protocol (PTP) time.

The computing-implemented method may also include where the messages are synchronization messages or follow up messages for a precision time protocol (PTP).

The computing-implemented method may also include where the clock managed by the clock circuitry is a precision time protocol (PTP) hardware clock (PHC).

The computing-implemented method may also include where the clock manager is a precision time protocol (PTP) for Linux (PTP4L) software component configured to account for a time offset between a clock of a clock leader (CL) in a PTP-synchronized network and the clock for a device when operating as a clock follower (CF) in the PTP-synchronized network.

The computing-implemented method may also include where the clock manager control information to comprise a time offset between a reference time and a time maintained by the clock, the reference time based on the time information in at least one message.

The computing-implemented method may also include where the clock manager control information to comprise one or more parameters to adjust clock circuitry for a device, the one or more parameters to represent adjustments to a phase or frequency of the clock circuitry.

The computing-implemented method may also include includes generating the model control information based on the clock model, the clock model to comprise a physics-based analytical model to represent physical relationships between components of a system.

The computing-implemented method may also include includes generating the model control information based on the clock model, where the clock model is an equation-based representation of a proportional-integral (PI) controller.

The computing-implemented method may also include includes determining whether to generate an alert based on the difference information, and comparing the difference information measured periodically to a defined threshold representing a value in parts per billion (ppb).

The computing-implemented method may also include includes determining whether to generate an alert based on the difference information, and comparing the difference information measured every synchronization cycle to a defined threshold represented in units of parts per billion (ppb), the defined threshold to be equal to or greater than 1 ppb.

The computing-implemented method may also include where the network is a controller area network (CAN) or a vehicle area network (VAN).

The computing-implemented method may also include includes receiving the alert, and taking corrective action for a device or the network. Other technical features may be readily apparent to one skilled in the art from the following figures, descriptions, and claims.

In one aspect, a non-transitory computer-readable storage device, storing instructions that when executed by processing circuitry of a controller of a time sensitive network (TSN), cause the controller to receive messages with time information for a network, generate clock manager control information to adjust a clock to a network time for the network, receive the clock manager control information, generate model control information based on a clock model, compare the clock manager control information with the model control information to generate difference information, and determine whether to generate an alert based on the difference information.

The non-transitory computer-readable storage device may also include where the network is a time sensitive network.

The non-transitory computer-readable storage device may also include where the network operates in accordance with an Institute of Electrical and Electronics Engineers (IEEE) 802.1AS and/or 802.1Qbv and/or 802.15.4 standards.

The non-transitory computer-readable storage device may also include where the network time is a precision time protocol (PTP) time.

The non-transitory computer-readable storage device may also include where the messages are synchronization messages or follow up messages for a precision time protocol (PTP).

The non-transitory computer-readable storage device may also include where the clock managed by the clock circuitry is a precision time protocol (PTP) hardware clock (PHC).

The non-transitory computer-readable storage device may also include where the clock manager is a precision time protocol (PTP) for Linux (PTP4L) software component configured to account for a time offset between a clock of a clock leader (CL) in a PTP-synchronized network and the clock for a device when operating as a clock follower (CF) in the PTP-synchronized network.

The non-transitory computer-readable storage device may also include where the clock manager control information to comprise a time offset between a reference time and a time maintained by the clock, the reference time based on the time information in at least one message.

The non-transitory computer-readable storage device may also include where the clock manager control information to comprise one or more parameters to adjust clock circuitry for a device, the one or more parameters to represent adjustments to a phase or frequency of the clock circuitry.

The computer-readable storage medium may also include the instructions, when executed by the processing circuitry, cause the controller to generate the model control information based on the clock model, the clock model to comprise a physics-based analytical model to represent physical relationships between components of a system.

The computer-readable storage medium may also include the instructions, when executed by the processing circuitry, cause the controller to generate the model control information based on the clock model, where the clock model is an equation-based representation of a proportional-integral (PI) controller.

The computer-readable storage medium may also include the instructions, when executed by the processing circuitry, cause the controller to determine whether to generate an alert based on the difference information, and compare the difference information measured periodically to a defined threshold representing a value in parts per billion (ppb).

The computer-readable storage medium may also include the instructions, when executed by the processing circuitry, cause the controller to determine whether to generate an alert based on the difference information, and compare the difference information measured every synchronization cycle to a defined threshold represented in units of parts per billion (ppb), the defined threshold to be equal to or greater than 1 ppb.

The non-transitory computer-readable storage device may also include where the network is a controller area network (CAN) or a vehicle area network (VAN).

The computer-readable storage medium may also include the instructions, when executed by the processing circuitry, cause the controller to receive the alert, and send control information to take corrective action for a device or the network. Other technical features may be readily apparent to one skilled in the art from the following figures, descriptions, and claims.

In one aspect, an apparatus, includes means for receiving messages with time information for a network, means for generating clock manager control information to adjust a clock to a network time for the network, means for receiving the clock manager control information, means for generating model control information based on a clock model, means for comparing the clock manager control information with the model control information to generate difference information, and means for determining whether to generate an alert based on the difference information.

The apparatus may also include where the network is a time sensitive network.

The apparatus may also include where the network operates in accordance with an Institute of Electrical and Electronics Engineers (IEEE) 802.1AS and/or 802.1Qbv and/or 802.15.4 standards.

The apparatus may also include where the network time is a precision time protocol (PTP) time.

The apparatus may also include where the messages are synchronization messages or follow up messages for a precision time protocol (PTP).

The apparatus may also include where the clock managed by the clock circuitry is a precision time protocol (PTP) hardware clock (PHC).

The apparatus may also include where the clock manager is a precision time protocol (PTP) for Linux (PTP4L) software component configured to account for a time offset between a clock of a clock leader (CL) in a PTP-synchronized network and the clock for a device when operating as a clock follower (CF) in the PTP-synchronized network.

The apparatus may also include where the clock manager control information to comprise a time offset between a reference time and a time maintained by the clock, the reference time based on the time information in at least one message.

The apparatus may also include where the clock manager control information to comprise one or more parameters to adjust clock circuitry for a device, the one or more parameters to represent adjustments to a phase or frequency of the clock circuitry.

The apparatus may also include includes means for generating the model control information based on the clock model, the clock model to comprise a physics-based analytical model to represent physical relationships between components of a system.

The apparatus may also include includes means for generating the model control information based on the clock model, where the clock model is an equation-based representation of a proportional-integral (PI) controller.

The apparatus may also include includes means for determining whether to generate an alert based on the difference information, and means for comparing the difference information measured periodically to a defined threshold representing a value in parts per billion (ppb).

The apparatus may also include includes means for determining whether to generate an alert based on the difference information, and means for comparing the difference information measured every synchronization cycle to a defined threshold represented in units of parts per billion (ppb), the defined threshold to be equal to or greater than 1 ppb.

The apparatus may also include where the network is a controller area network (CAN) or a vehicle area network (VAN).

The apparatus may also include includes means for receiving the alert, and means for sending control information to take corrective action for a device or the network. Other technical features may be readily apparent to one skilled in the art from the following figures, descriptions, and claims.

What is claimed is:

1. An apparatus, comprising:
a clock circuitry to provide a clock for a device;
a processing circuitry coupled to the clock circuitry, the processing circuitry to execute instructions to perform operations for a clock manager, the clock manager to receive messages with time information for a network and generate clock manager control information to adjust the clock to a network time for the network; and
a detector coupled to the processing circuitry and the clock circuitry, the detector comprising a clock manager estimator to receive the clock manager control information and generate model control information based on a clock manager model comprising an analytical model representing a behavior of the clock manager, the detector to compare the clock manager control information with the model control information to generate difference information, and determine whether to generate an alert based on the difference information.

2. The apparatus of claim 1, wherein the network is a time sensitive network.

3. The apparatus of claim 1, wherein the device operates in accordance with an Institute of Electrical and Electronics Engineers (IEEE) 802.1AS, 802.1Qbv or 802.15.4 standards.

4. The apparatus of claim 1, wherein the network time is a precision time protocol (PTP) time.

5. The apparatus of claim 1, wherein the messages are synchronization messages or follow up messages for a precision time protocol (PTP).

6. The apparatus of claim 1, wherein the clock managed by the clock circuitry is a precision time protocol (PTP) hardware clock (PHC).

7. The apparatus of claim 1, wherein the device operates in a clock follower (CF) role.

8. The apparatus of claim 1, wherein the clock manager is a precision time protocol (PTP) for Linux (PTP4L) software component configured to account for a time offset between a clock of a clock leader (CL) in a PTP-synchronized network and the clock for the device when operating as a clock follower (CF) in the PTP-synchronized network.

9. The apparatus of claim 1, wherein the clock manager control information to comprise a time offset between a reference time and a time maintained by the clock, the reference time based on the time information in at least one message.

10. The apparatus of claim 1, wherein the clock manager control information to comprise one or more parameters to adjust the clock circuitry for the device, the one or more parameters to represent adjustments to a phase or frequency of the clock circuitry.

11. A computing-implemented method, comprising:
receiving messages with time information for a network;
generating, by a clock manager, clock manager control information to adjust a clock to a network time for the network;
receiving, by a detector, the clock manager control information;
generating, by a clock manager estimator of the detector, model control information based on a clock manager model comprising an analytical model representing a behavior of the clock manager;
comparing, by the detector, the clock manager control information with the model control information to generate difference information; and
determining, by the detector, whether to generate an alert based on the difference information.

12. The computing-implemented method of claim 11, wherein the network is a time sensitive network.

13. The computing-implemented method of claim 11, wherein the network operates in accordance with an Institute of Electrical and Electronics Engineers (IEEE) 802.1AS, 802.1Qbv or 802.15.4 standards.

14. The computing-implemented method of claim 11, wherein the network time is a precision time protocol (PTP) time.

15. The computing-implemented method of claim 11, wherein the messages are synchronization messages or follow up messages for a precision time protocol (PTP).

16. The computing-implemented method of claim 11, wherein the clock managed by the clock circuitry is a precision time protocol (PTP) hardware clock (PHC).

17. The computing-implemented method of claim 11, wherein the clock manager is a precision time protocol (PTP) for Linux (PTP4L) software component configured to account for a time offset between a clock of a clock leader (CL) in a PTP-synchronized network and the clock for a device when operating as a clock follower (CF) in the PTP-synchronized network.

18. A non-transitory computer-readable storage device, storing instructions that when executed by processing circuitry of a controller of a time sensitive network (TSN), cause the controller to:
receive messages with time information for a network;
generate, by a clock manager, clock manager control information to adjust a clock to a network time for the network;
receive, by a detector, the clock manager control information;
generate, by a clock manager estimator of the detector, model control information based on a clock manager model comprising an analytical model representing a behavior of the clock manager;
compare, by the detector, the clock manager control information with the model control information to generate difference information; and
determine, by the detector, whether to generate an alert based on the difference information.

19. The non-transitory computer-readable storage device of claim 18, wherein the network is a time sensitive network.

20. The non-transitory computer-readable storage device of claim 18, wherein the network operates in accordance with an Institute of Electrical and Electronics Engineers (IEEE) 802.1AS, 802.1Qbv or 802.15.4 standards.

21. The non-transitory computer-readable storage device of claim 18, wherein the network time is a precision time protocol (PTP) time.

22. The non-transitory computer-readable storage device of claim 18, wherein the messages are synchronization messages or follow up messages for a precision time protocol (PTP).

23. The non-transitory computer-readable storage device of claim 18, wherein the clock managed by the clock circuitry is a precision time protocol (PTP) hardware clock (PHC).

24. The non-transitory computer-readable storage device of claim 18, wherein the clock manager is a precision time protocol (PTP) for Linux (PTP4L) software component configured to account for a time offset between a clock of a clock leader (CL) in a PTP-synchronized network and the clock for a device when operating as a clock follower (CF) in the PTP-synchronized network.

25. The non-transitory computer-readable storage device of claim 18, wherein the clock manager control information to comprise a time offset between a reference time and a time maintained by the clock, the reference time based on the time information in at least one message.

* * * * *